United States Patent
Ye et al.

(10) Patent No.: US 9,078,008 B2
(45) Date of Patent: Jul. 7, 2015

(54) ADAPTIVE INTER-LAYER INTERPOLATION FILTERS FOR MULTI-LAYERED VIDEO DELIVERY

(75) Inventors: Yan Ye, San Diego, CA (US); Peshala V. Pahalawatta, Glendale, CA (US); Alexandros Tourapis, Milpitas, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 930 days.

(21) Appl. No.: 13/257,579

(22) PCT Filed: Apr. 20, 2010

(86) PCT No.: PCT/US2010/031701
§ 371 (c)(1),
(2), (4) Date: Sep. 19, 2011

(87) PCT Pub. No.: WO2010/123862
PCT Pub. Date: Oct. 28, 2010

(65) Prior Publication Data
US 2012/0027079 A1     Feb. 2, 2012

Related U.S. Application Data

(60) Provisional application No. 61/170,995, filed on Apr. 20, 2009, provisional application No. 61/300,427, filed on Feb. 1, 2010, provisional application No. 61/295,034, filed on Jan. 14, 2010, provisional application No. 61/223,027, filed on Jul. 4, 2009.

(51) Int. Cl.
*H04N 7/12*        (2006.01)
*H04N 19/82*     (2014.01)
(Continued)

(52) U.S. Cl.
CPC .............. *H04N 19/82* (2014.11); *H04N 19/597* (2014.11); *H04N 19/147* (2014.11); *H04N 19/63* (2014.11);
(Continued)

(58) Field of Classification Search
CPC . H04N 19/117; H04N 19/147; H04N 19/187; H04N 19/19; H04N 19/192; H04N 19/597; H04N 19/63; H04N 19/82
USPC ..................................................... 375/240.02
See application file for complete search history.

(56) References Cited

U.S. PATENT DOCUMENTS 7,489,342 B2    2/2009   Xin
8,149,910 B2    4/2012   Tanizawa
(Continued)

FOREIGN PATENT DOCUMENTS

EP           1631090       3/2006
EP           1720358      11/2006
(Continued)

OTHER PUBLICATIONS

Schwarz, et al., "SVC overview" ITU Study Group 16—Video Coding Experts—ISO/IEC MPEG & ITU-T VCEG(ISO-IEC JTC1/SC29/WG11 and ITU-T SG16 Q6), XX, XX, No. JVT-U145, Oct. 20, 2006.
(Continued)

*Primary Examiner* — Jessica M Prince

(57) ABSTRACT

Adaptive interpolation filters for multi-layered video delivery are described. Combinations of such adaptive filters with other pre-processing steps in the context of frame or 2D compatible 3D and 2D scalable video delivery system are also addressed.

21 Claims, 10 Drawing Sheets

(51) Int. Cl.
H04N 19/597 (2014.01)
H04N 19/147 (2014.01)
H04N 19/63 (2014.01)
H04N 19/117 (2014.01)
H04N 19/187 (2014.01)
H04N 19/19 (2014.01)
H04N 19/192 (2014.01)

(52) U.S. Cl.
CPC .......... H04N 19/117 (2014.11); H04N 19/187 (2014.11); H04N 19/19 (2014.11); H04N 19/192 (2014.11)

(56) References Cited

U.S. PATENT DOCUMENTS

| | | | | |
|---|---|---|---|---|
| 2006/0023782 | A1* | 2/2006 | Cai et al. | 375/240.03 |
| 2006/0083308 | A1* | 4/2006 | Schwarz et al. | 375/240.16 |
| 2006/0268991 | A1* | 11/2006 | Segall et al. | 375/240.24 |
| 2010/0061447 | A1* | 3/2010 | Tu et al. | 375/240.03 |

FOREIGN PATENT DOCUMENTS

| | | |
|---|---|---|
| JP | 2006-081161 | 3/2006 |
| JP | 2007-159111 | 6/2007 |
| WO | 2007/063808 | 6/2007 |
| WO | 2010/123909 | 10/2010 |
| WO | 2011/005624 | 1/2011 |
| WO | 2011/087932 | 7/2011 |

OTHER PUBLICATIONS

Vetro, A., et al., "Comments on Requirements fo Multiview Video Coding" ITU Study Group 16—Video Coding Experts Group—ISO/IEC MPEG & ITU-T VCEG(ISO/IEC JTC1/SC29/WG11 and ITU-T SG16 06), XX, XX, No. M12078, Apr. 29, 2005.

Chen et al., "Adaptive Filter for Spatial Scalability Video Coding" 25. Picture Coding Symposium; Apr. 24-26, 2006; Beijing, , Apr. 24, 2006.

Hutchison, David, "Introducing DLP 3-D TV" , DLP Texas Insruments.

ITU-T, H.264, "Advanced Video Coding for Generic Audiovisual Services" Mar. 2003.

Vatis, et al., "Comparison of Complexity between Two-Dimensional Non-Separable Adaptive Interpolation Filter and Standard Wiener Filter", 28th Meeting: Nice, FR, Apr. 16-22, 2005.

Wittmann, et al., "Separable Adaptive Interpolation Filter for Video Coding" Proc. ICIP 2008, IEEE International Conference on Image Processing, San Diego, CA, Oct. 2008.

Rusanovskyy, et al., "Adaptive Interpolation with Directional Filters" ITU-T SGI, Shenzhen, China, Oct. 2007.

Ye, et al., "Enhanced Adaptive Interpolation Filter" ITU-T/SG16, Geneva, Switzerland, Apr. 2008.

Vatis, et al., "Two-Dimensional Non-Separable Adaptive Wiener Interpolation Filter for H.264/AVC", ITU-T SGI, Busan, Korea, Apr. 2005.

Motta, et al., "Improved Filter Selection for B-Slices in E-AIF" ITU—VCEG 35th meeting in Berlin, Germany, Jul. 16-18, 2008.

* cited by examiner

ADAPTIVE INTER-LAYER INTERPOLATION FILTERS FOR MULTI-LAYERED VIDEO DELIVERY

CROSS REFERENCE TO RELATED APPLICATIONS

The present disclosure claims priority to U.S. Provisional Application No. 61/170,995 filed on Apr. 20, 2009, U.S. Provisional Application No. 61/223,027 filed on Jul. 4, 2009, U.S. Provisional Application No. 61/295,034 filed on Jan. 14, 2010, and U.S. Provisional Application No. 61/300,427 filed on Feb. 1, 2010, all incorporated by reference in each entireties.

FIELD

This disclosure relates to image processing and video compression. More particularly, embodiments of the present disclosure relate to multi-layered video delivery. Exemplary embodiments of multi-layered video delivery include, but are not limited to, 2D scalable coding, 2D compatible 3D, and frame compatible 3D.

BACKGROUND

To facilitate rapid adoption of stereoscopic (3D) content among consumers, the ideal in-home 3D systems should be those that can be implemented with minimal or no alteration to existing playback devices such as set-top boxes, DVD, and Blu-ray disc players. They should also be maximally compatible with existing 3D capable displays, such as DLP (see reference 1, incorporated herein by reference in its entirety) displays by Samsung and Mitsubishi, some plasma displays, and polarization based and frame sequential LCD displays.

The desire for full resolution 3D content has led to some systems, such as the Multiview Video Coding (MVC) extension of the MPEG-4 AVC/H.264 video coding standard (see reference 3, incorporated herein in by reference in its entirety), to utilize two or more layers, with the base layer representing one view and each enhancement layer representing an additional view, all of which are in the original resolution.

The Scalable Video Coding (SVC) extension to H.264/AVC (Annex G in [2]) defines a multi-layered video coding system for 2D video coding. The SVC extension provides various types of scalability: spatial scalability, quality scalability, temporal scalability, or any combinations thereof. For example, in spatial scalability, a base layer bitstream carries a video signal of a lower spatial resolution, while an enhancement layer bitstream carries additional information, such that when decoded together with the base layer bitstream, a video signal of a higher spatial resolution can be obtained. As another example, in quality scalability, the enhancement layer bitstream carries additional information that can improve the quality of the video signal carried by the base layer bitstream. As will become apparent in the descriptions that follow, the teachings in the present application can further improve the coding performance of a 2D scalable video system such as the SVC system.

BRIEF DESCRIPTION OF THE DRAWINGS

The accompanying drawings, which are incorporated into and constitute a part of this specification, illustrate one or more embodiments of the present disclosure and, together with the description of example embodiments, serve to explain the principles and implementations of the disclosure.

DESCRIPTION OF EXAMPLE EMBODIMENTS

Overview

Embodiments of the present disclosure relate to image processing and video compression.

U.S. Provisional Application 61/170,995 incorporated here by reference in its entirety discloses a system that enables the guided processing of an image or video signal that could be utilized in video compression or post-processing applications. Processing could, for example be filtering, or interpolation (scaling) of the image with a specific filter or mechanism which may result in a certain desirable performance or behavior.

Figure 1:
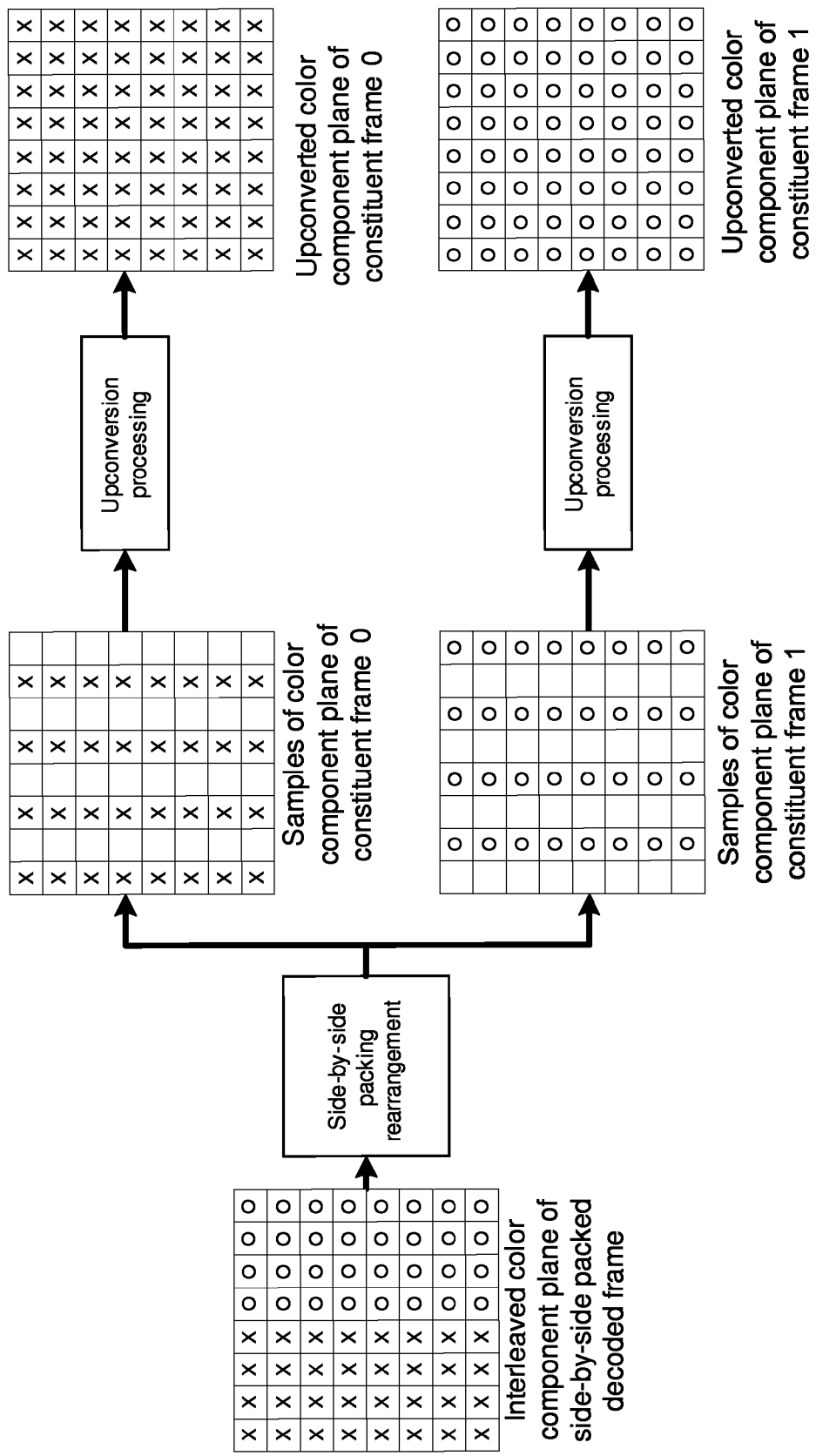
FIG. 1 shows horizontal sampling/side by side arrangement for the delivery of stereoscopic material.

U.S. Provisional Application 61/223,027 incorporated herein by reference in its entirety, discloses a FCFR (frame-compatible full-resolution) 3D system. Various methods of frame compatible configurations are allowed using a variety of filtering, sampling, and arrangement methods. Sampling could, for example, be horizontal, vertical, or quincunx. Similarly, arrangements could include side by side, over-under, line-interleaved, checkerboard packing, and so on. An exemplar frame configuration (horizontal sampling/side-by-side arrangement) is shown in FIG. 1. In FIG. 1, the left-view frame and the right-view frame are horizontally subsampled and packed side-by-side into one video frame. Additional examples of frame sampling/arrangements include the following possibilities, among others. Further, views may also be subsampled asymmetrically.

Quincunx Sampling/Checkerboard Interleaved Arrangement

Horizontal Sampling/Column Interleaved Arrangement

Vertical Sampling/Row Interleaved Arrangement

Vertical Sampling/Over-Under Arrangement

Quincunx Sampling/Side by Side Arrangement

Subsampling reduces frame resolution and therefore may degrade the user experience of high quality 3D content. Filtering may be applied during subsampling to alleviate some potential problems (e.g., aliasing) and to improve video quality. Nonetheless, the delivery of full resolution stereoscopic material is relevant for fast adoption and deployment of 3D systems in many applications.

According to some aspects of the frame compatible 3D system described in U.S. Provisional Application 61/233,027 (see FIGS. 2-5), the base layer corresponds to two views that had been previously subsampled and multiplexed using any of a variety of sampling methods and arrangements as mentioned above. To achieve full resolution video delivery, the enhancement layer is used to convey missing video information related to the higher resolution (for example, some high frequency information) for both views.

Figure 2:
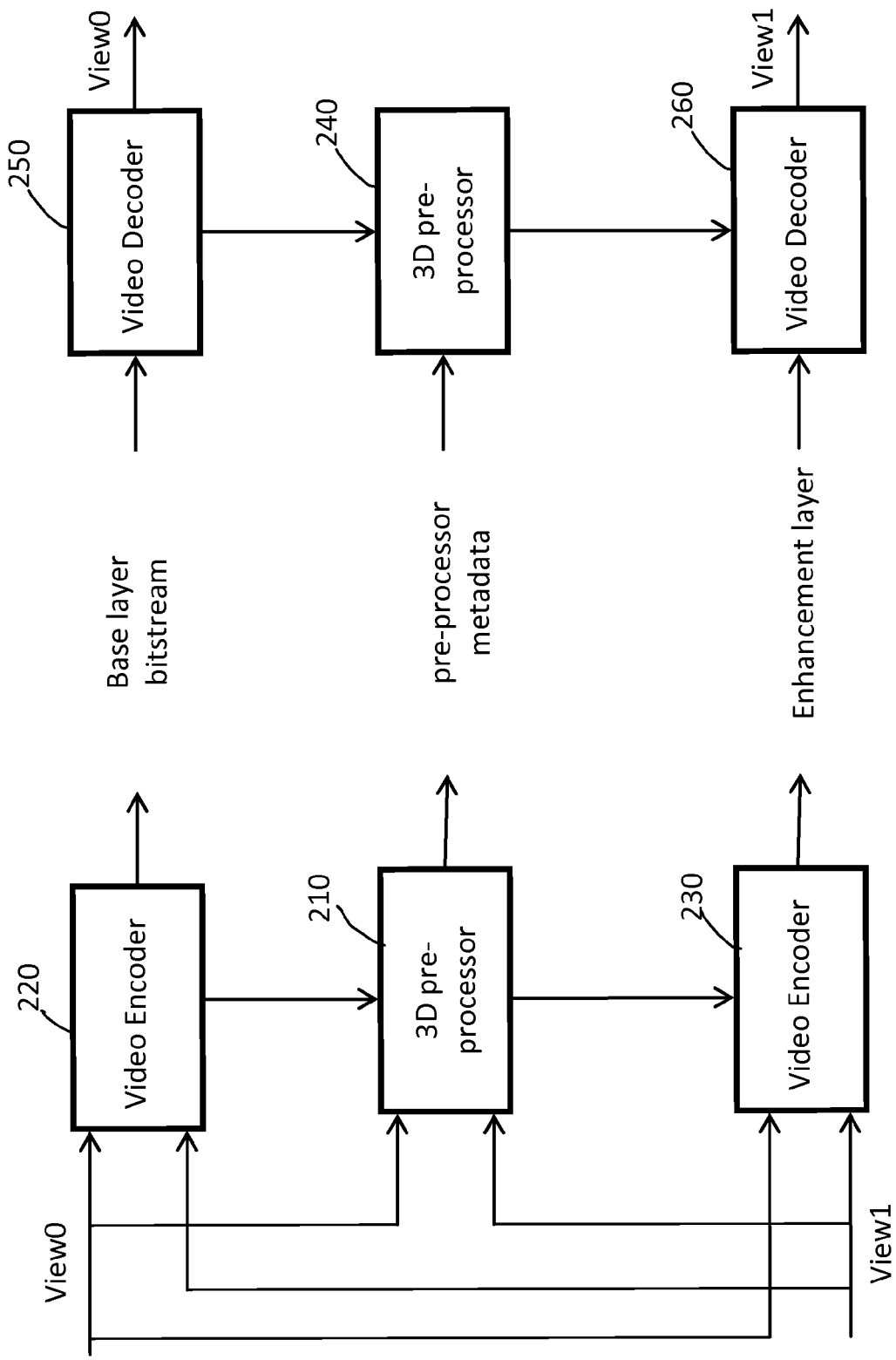
FIG. 2 shows a frame compatible 3D system architecture.
Figure 3:
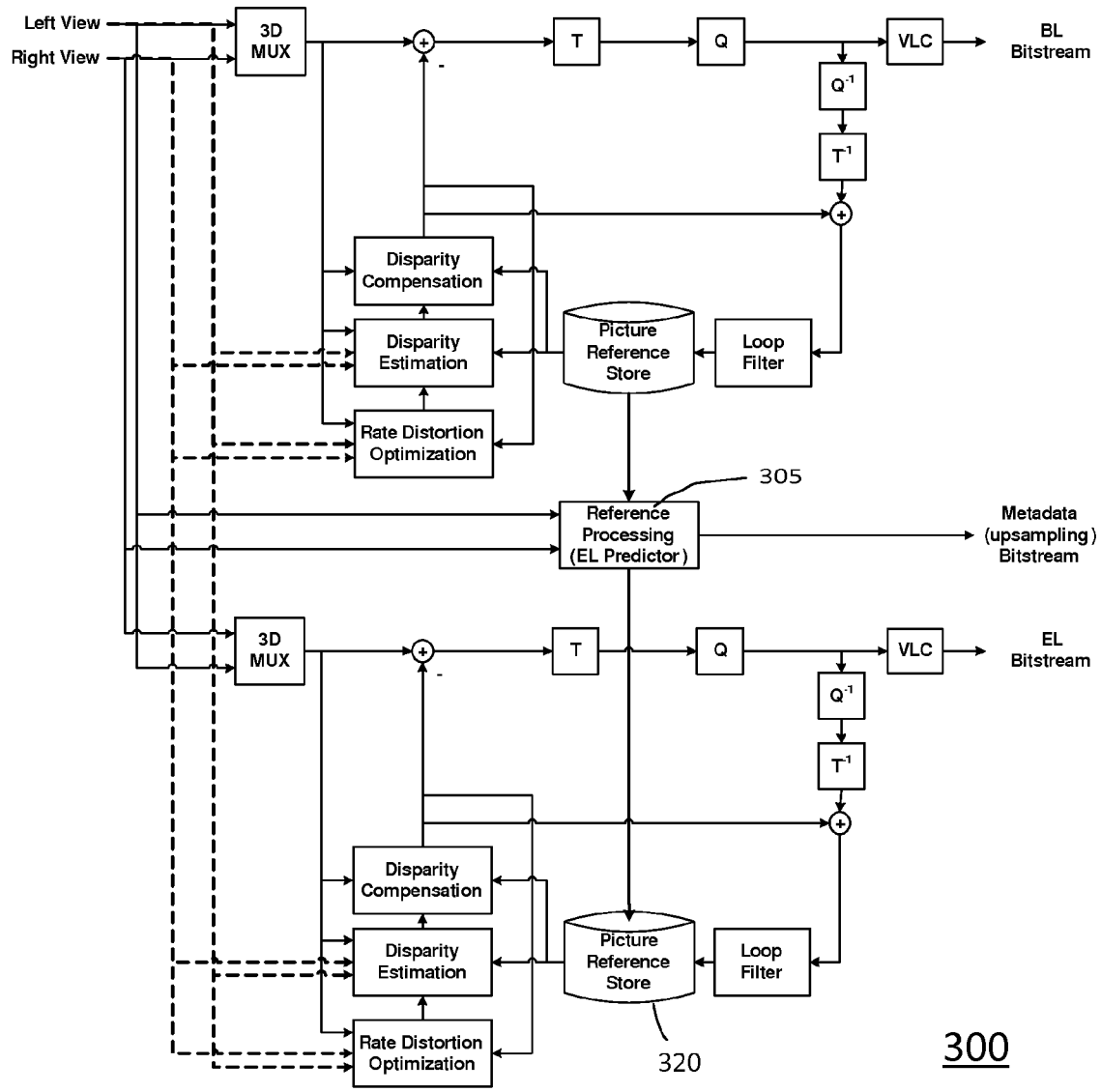
FIG. 3 shows a diagram of the frame compatible 3D system on the encoder side.
Figure 4:
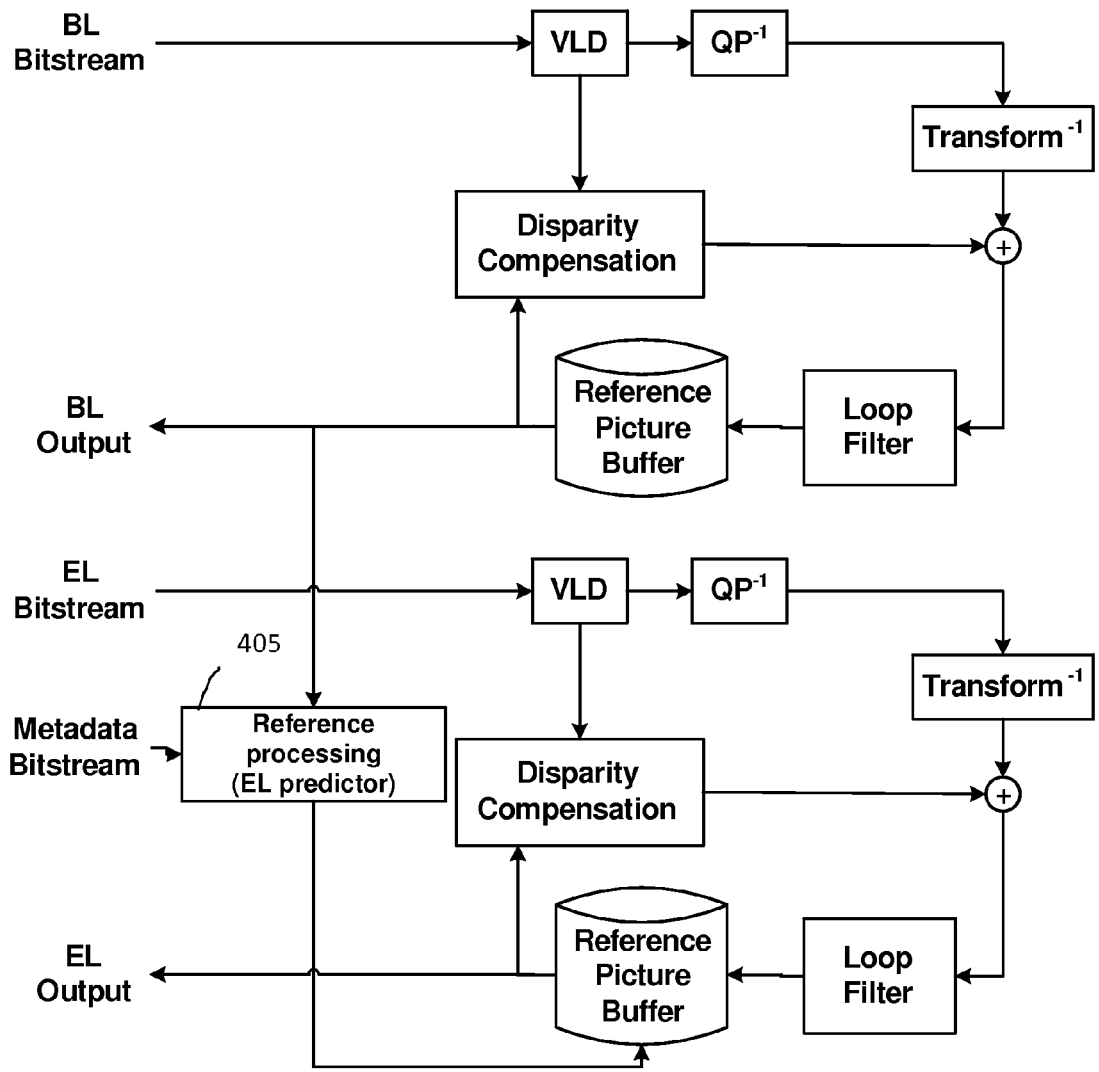
FIG. 4 shows a diagram of the frame compatible 3D system on the decoder side.
Figure 5:
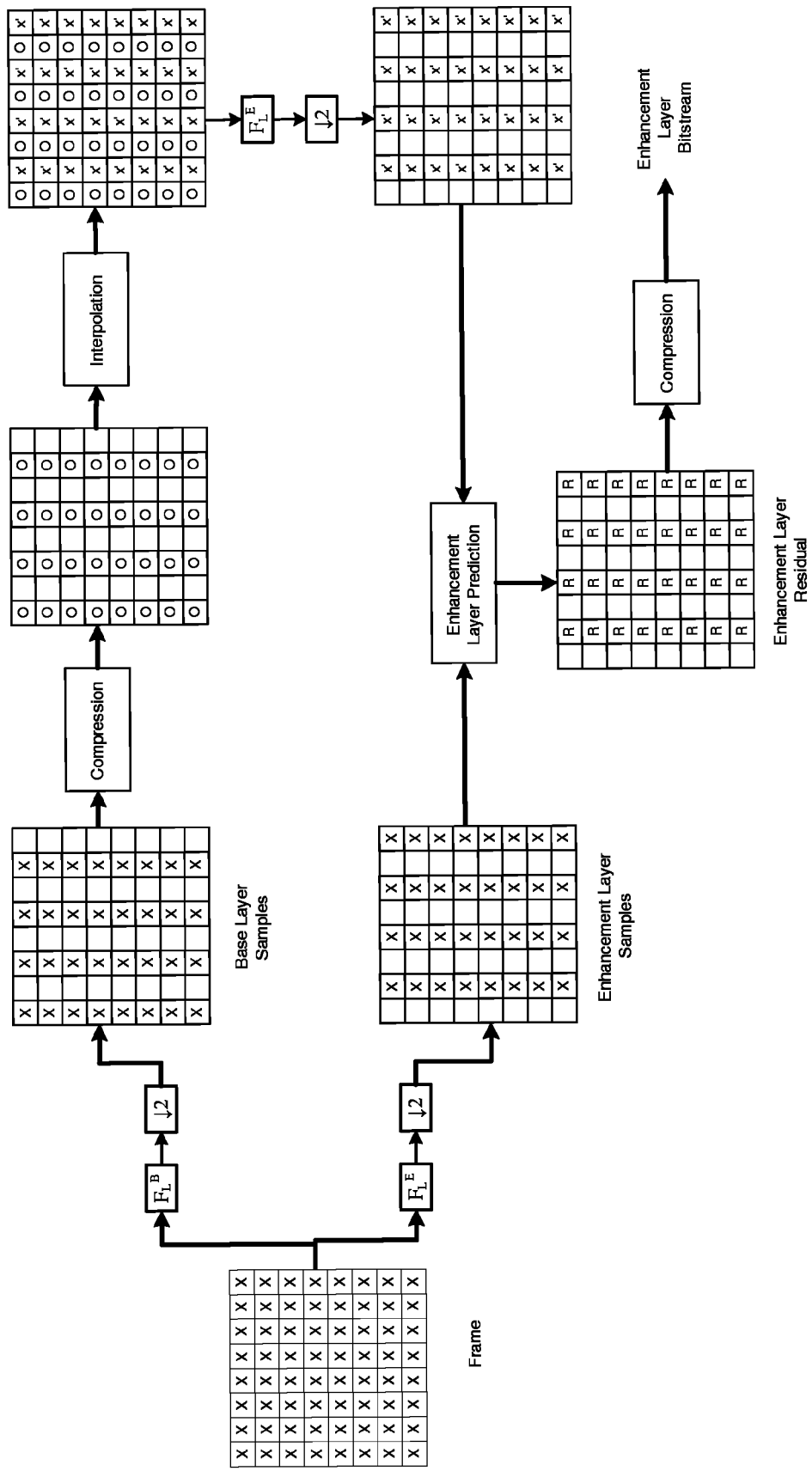
FIG. 5 shows the prediction process of the enhancement layer given the base layer for a horizontal sampling+side by side packing arrangement.

Video signals represented by the base and enhancement layers are highly correlated. Therefore, to facilitate efficient compression of the enhancement layer, base layer reconstructed video may be used as prediction when coding the enhancement layer video. Further, as shown in FIGS. 2 to 4, a pre-processing stage may be introduced to process the base layer information before utilizing it as potential prediction for the enhancement layer. Such pre-processing may include global motion compensation correction, fixed or adaptive interpolation mechanisms that account for the characteristics of the sampling and arrangement methods used by the system, and so on.

For example, processing could include separable or non-separable interpolation filters, edge adaptive interpolation mechanisms, filters based on wavelet, bandlet, or ridgelet methods, and so on. The design and selection of the pre-processing method(s) can be part of an encoder decision, or it can be based on user input with various considerations such as cost, complexity, and coding/quality performance.

For the sake of clarity and ease of read, a high level block diagram of a 3D system architecture according to the above-mentioned U.S. Provisional 61/223,027 is shown in FIG. 2. A reference processing unit (RPU) (210), for example a 3D RPU is shown on the encoding side between base layer video encoder (220) and enhancement layer video encoder (230), and an RPU (240), for example a 3D RPU, is shown on the decoding side between base layer video decoder (250) and enhancement layer video decoder (260). See also U.S. Provisional Application 61/170,995 incorporated here by reference in its entirety. The reference processing unit (210) takes a reference picture and a current picture to be coded, and performs a directed processing of the reference picture to make the reference picture as similar as possible to the current picture. In this way, correlation that may exist between these two pictures is exploited.

Figure 10:
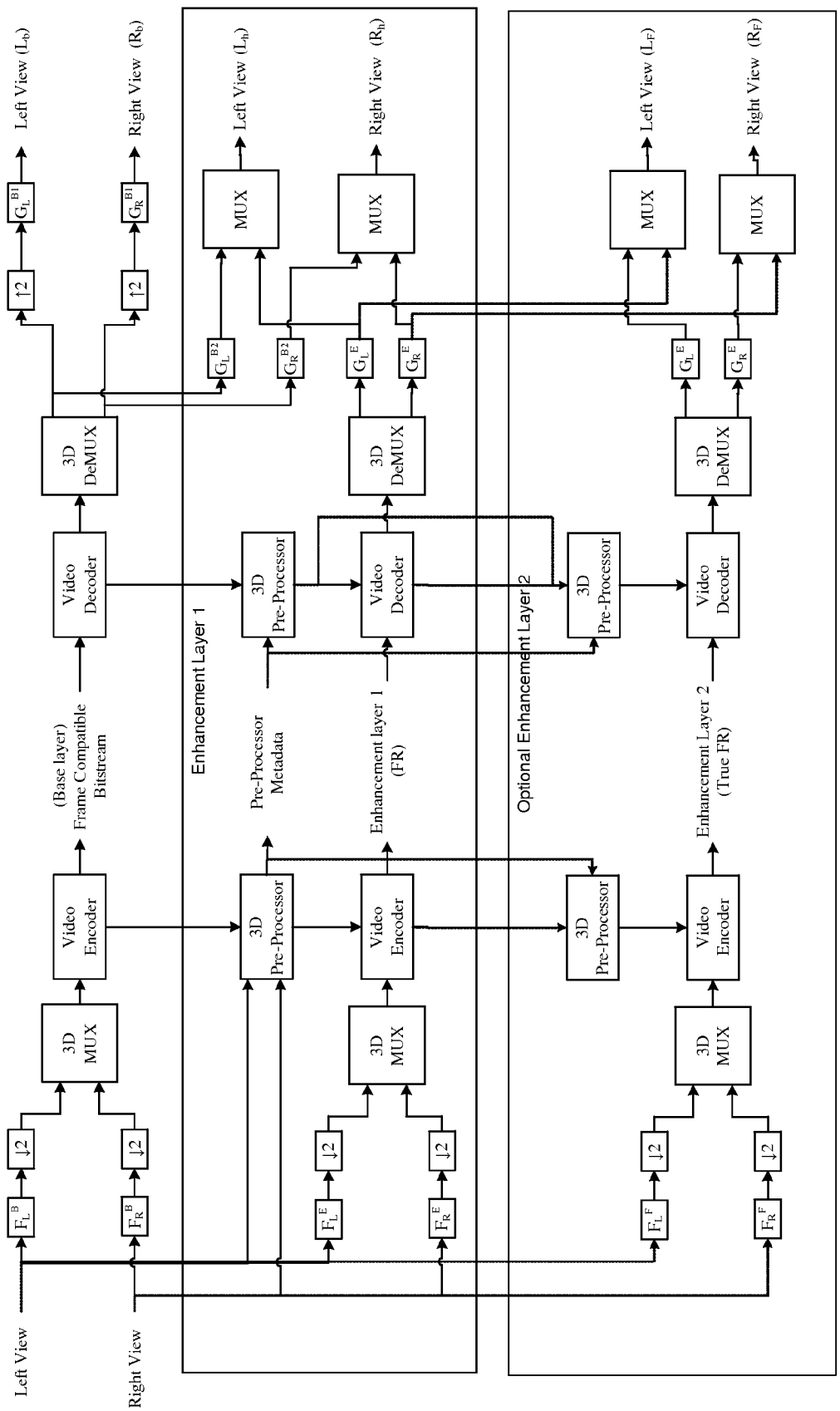
FIG. 10 shows a multi-layer frame compatible 3D video system.

As shown in FIG. 2, the 3D RPU (210) generates metadata information further described later and in general, the role of this pre-processing stage is to process and adjust the characteristics of the base layer video to better match those of the enhancement layer video. This can be done, for example, by considering pre-processing mechanisms such as filtering (e.g., a sharpening or a low pass filter) or even other more sophisticated methods such as global/region motion compensation/texture mapping. The person skilled in the art will understand that the methods described throughout the present disclosure can also apply to 3D video systems and 2D scalable video systems comprising more than one enhancement layer. FIG. 10 shows an example of such systems, e.g. a frame compatible 3D video system with two enhancement layers.

In the rest of this disclosure, techniques based on interpolation filters are discussed. Further, considerations for combining interpolation with other pre-processing steps are also addressed.

According to a first aspect, a multi-layered video encoding system is provided, comprising: a base layer, comprising a base layer video encoder; at least one enhancement layer, associated with the base layer, the at least one enhancement layer comprising an enhancement layer video encoder; and an encoder processing module to filter an output of the base layer video encoder to form a processed encoder output and input the processed encoder output into the enhancement layer video encoder as an enhancement layer estimate.

According to a second aspect, a multi-layered video system is provided, comprising: a base layer, comprising a base layer video encoder and a base layer video decoder; at least one enhancement layer, associated with the base layer, the at least one enhancement layer comprising an enhancement layer video encoder and an enhancement layer video decoder; an encoder processing module to filter an output of the base layer video encoder to form a processed encoder output and input the processed encoder output into the enhancement layer video encoder as an enhancement layer estimate; and a decoder processing module to process an output of the base layer video decoder to form a processed decoder output to reconstruct the enhancement layer and input the processed decoder output into the enhancement layer video decoder.

According to a third aspect, a multi-layered video decoding system is provided, comprising: a base layer, comprising a base layer video decoder; at least one enhancement layer, associated with the base layer, the at least one enhancement layer comprising an enhancement layer video decoder; and a decoder processing module to process an output of the base layer video decoder to form a decoder processed output and input the decoder processed output into the enhancement layer video decoder, the decoder processing module comprising adaptive filters to reconstruct an enhancement layer video signal, and one or more decoding filter buffers where adaptive filters derived for previous signals are stored and used for decoding of future video signals.

According to a fourth aspect, a multi-layered video system, comprising: a base layer, comprising a base layer video encoder and a base layer video decoder; at least one enhancement layer, associated with the base layer, the at least one enhancement layer comprising an enhancement layer video encoder and an enhancement layer video decoder; an encoder processing module to process an output of the base layer video encoder to form an encoder processed output and input the encoder processed output into the enhancement layer video encoder, the encoder processing module comprising adaptive filters to estimate an enhancement layer video signal based on a base layer video signal; a decoder processing module to process the output of the base layer video decoder to form a decoder processed output and input the decoder processed output into the enhancement layer video decoder, the decoder comprising adaptive filters to reconstruct the enhancement layer video signal based on the base layer video signal; one or more encoding filter buffers where adaptive filters derived for previous signals are stored and used for encoding of future video signals; and one or more decoding filter buffers where adaptive filters derived for previous signals are stored and used for decoding of future video signals.

According to a fifth aspect, a multi-layered video method is provided, comprising: base layer video encoding a base layer video signal; processing the base layer video signal; enhancement layer video encoding an enhancement layer video signal; adaptive filtering the base layer video signal to estimate the enhancement layer video signal; filtering the base layer video signal to estimate the enhancement layer video signal using fixed filters; establishing a coding criterion; based on the coding criterion, establishing qualities of an enhancement layer video signal estimation for both the adaptive filtering and the fixed filtering; selecting a best performing filter based on the established qualities of estimation; signaling the best performing filter; adopting the best performing filter and the processed base layer video signal for the enhancement video layer encoding; base layer video decoding the base layer video signal to form a decoded video signal; processing the base layer decoded video signal; adopting the processed base layer decoded video signal and the signaled best performing filter for enhancement layer video decoding; and enhancement layer video decoding the enhancement layer video signal.

According to a sixth aspect, a multi-layered video encoding method is provided, comprising: base layer video encoding a base layer video signal; processing the base layer video signal; enhancement layer video encoding an enhancement layer video signal; performing motion prediction on the base layer video signal to form a predicted base layer video signal; adaptive filtering the predicted base layer video signal to estimate the enhancement layer video signal; filtering the predicted base layer video signal to estimate the enhancement layer video signal using fixed filters; establishing a coding criterion; based on the coding criterion, establishing qualities of the enhancement layer video signal estimation for both the adaptive filtering and the fixed filtering; selecting a best performing filter based on the established qualities of estimation; signaling the best performing filter, and adopting the best performing filter and the processed base layer video signal for the enhancement video layer encoding.

According to a seventh aspect, a multi-layered video method is provided, comprising: base layer video encoding a base layer video signal; processing the base layer video signal; enhancement layer video encoding an enhancement layer video signal; enhancement layer video encoding an enhancement layer video signal; performing motion prediction on the base layer video signal to form a predicted base layer video signal; adaptive filtering the predicted base layer video signal to estimate the enhancement layer video signal; establishing a coding criterion; based on the coding criterion, establishing qualities of the enhancement layer video signal estimation for both the adaptive filtering and the fixed filtering; selecting a best performing filter based on the established qualities of estimation; signaling the best performing filter; adopting the best performing filter and the processed base layer video signal for the enhancement video layer encoding; base layer video decoding the base layer video signal; processing the base layer decoded video signal; adopting the processed base layer decoded video signal and the signaled best performing filter for enhancement layer video decoding; and enhancement layer video decoding the enhancement layer video signal.

According to an eighth aspect, a multi-layered video encoding method is provided, comprising: base layer video encoding a base layer video signal; processing the base layer video signal; enhancement layer video encoding an enhancement layer video signal; filtering the base layer video signal to estimate the enhancement layer video signal using fixed filters; and establishing a coding criterion to evaluate a quality of the enhancement layer video signal estimation; if the coding criterion is met by the fixed filtering: signaling the fixed filters; and adopting the fixed filters and the processed base layer video signal for the enhancement video layer encoding; else adaptive filtering the base layer video signal to estimate the enhancement layer video signal; based on the coding criterion, establishing qualities of the enhancement layer video signal estimation for both the adaptive filtering and the fixed filtering; selecting a best performing filter based on the established qualities of estimation; signaling the best performing filter; and adopting the best performing filter and the processed base layer video signal for the enhancement video layer encoding.

According to a ninth aspect, a multi-layered video method is provided, comprising: base layer video encoding a base layer video signal; processing the base layer video signal; enhancement layer video encoding an enhancement layer video signal; filtering the base layer video signal to estimate the enhancement layer video signal using fixed filters; and establishing a coding criterion to evaluate a quality of an enhancement layer video signal estimation; if the coding criterion is met by the fixed filtering: signaling the fixed filters; and adopting the fixed filters and the processed base layer video signal for the enhancement video layer encoding else adaptive filtering the base layer video signal to estimate the enhancement layer video signal; based on the coding criterion, establishing qualities of the enhancement layer video signal; based on the coding criterion, establishing qualities of the enhancement layer video signal estimation for both the adaptive filtering and the fixed filtering; selecting a best performing filter based on the established qualities of estimation; signaling the best performing filters; and adopting the best performing filters and the processed base layer video signal for the enhancement video layer encoding; base layer video decoding the base layer video signal; base layer video decoding the base layer video signal; processing the base layer decoded video signal; adopting the processed base layer decoded video signal and the signaled filter for enhancement layer video decoding, and enhancement layer video decoding the enhancement layer video signal.

According to a tenth aspect, a multi-layered video encoding method is provided, comprising: base layer video encoding a base layer video signal; processing the base layer video signal; enhancement layer video encoding an enhancement layer video signal; establishing one or more image characteristics criteria; identifying a number of neighboring regions of a current region of an enhancement layer video picture meeting the same one or more image characteristics criteria as the current region of the enhancement layer video picture; selecting the same filters for the current region of the enhancement layer video picture as filters adopted for filtering the number of neighboring regions meeting the same one or more image characteristics criteria; signaling the selected filters; and adopting the selected filters and the processed base layer video signal for the enhancement video layer encoding.

According to an eleventh aspect, a multi-layered video method is provided, comprising: base layer video encoding a base layer video signal; processing the base layer video signal; enhancement layer video encoding an enhancement layer video signal; establishing one or more image characteristics criteria; identifying a number of neighboring regions of a current region of an enhancement layer video picture meeting the same one or more image characteristics criteria as the current region of the enhancement layer video picture; selecting the same filters for the current region of the enhancement layer video picture as filters adopted for filtering the number of neighboring regions meeting the same one or more image characteristics criteria; signaling the selected filters; adopting the selected filters and the processed base layer video signal the enhancement video layer encoding; base layer video decoding the base layer video signal to form a base layer decoded video signal; processing the base layer decoded video signal; adopting the processed base layer decoded video signal and the signaled filters for enhancement layer video decoding; and enhancement layer video decoding the enhancement layer video signal to form a decoded second view.

According to a twelfth aspect, a multi-layered video encoding method is provided, comprising: base layer video encoding a base layer video signal; processing the base layer video signal; enhancement layer video encoding an enhancement layer video signal; establishing one or more image characteristics criteria; identifying a number of neighboring regions of a current region of an enhancement layer video picture meeting the same one or more image characteristics criteria as the current region of the enhancement layer video picture; establishing one or more filter characteristics criteria; from a set of filters, selecting a number of filters for the current region of the enhancement layer video picture meeting the same one or more filter characteristics criteria as filters adopted to filter the number of neighboring regions meeting the same one or more image characteristics criteria; signaling the selected number of filters; and adopting the selected filters and the processed base layer video signal for the enhancement video layer encoding.

According to a thirteenth aspect, a multi-layered video method is provided, comprising: base layer video encoding a base layer video signal; processing the base layer video signal; enhancement layer video encoding an enhancement layer video signal; establishing one or more image characteristics criteria; identifying a number of neighboring regions of a current region of an enhancement layer video picture meeting the same one or more image characteristics criteria as the current region of the enhancement layer video picture; establishing one or more filter characteristics criteria; from a set of filters, selecting a number of filters for the current region of the enhancement layer video picture meeting the same one or more filter characteristics criteria as filters adopted to filter the number of neighboring regions meeting the same one or more image characteristics criteria; signaling the selected number of filters; adopting the selected filters and the processed base layer video for the enhancement video layer encoding; base layer video decoding the base layer video signal to form a decoded video signal; processing the base layer decoded video signal; adopting the processed base layer decoded video signal and the signaled filters for enhancement layer video decoding; and enhancement layer video decoding the enhancement layer video signal.

Further aspects of the present disclosure are shown in the description, drawings and claims of the present application.

In what follows, a brief review of the derivation process for adaptive interpolation filters is given. This is followed by details of applying the adaptive filters within the exemplary context of the frame or 2D compatible 3D (stereo or multiview) or 2D scalable delivery system.

1. Adaptive Interpolation Filters Overview

Previously, adaptive interpolation filters (AIF) (see references 4-7, incorporated herein by reference in their entirety) have been studied extensively to improve the accuracy of the motion prediction process, which is used in many video coding systems such as H.264/AVC (see reference 3, incorporated herein by reference in its entirety) to reduce temporal redundancy. Throughout the present disclosure, an adaptive filter is defined as a filter, the coefficients of which are adaptively estimated based on a pre-defined coding criterion. As the coefficients of the adaptive filters are derived based on the incoming video signal's statistics, they may be applied to obtain a more accurate prediction signal for the enhancement layer by interpolating from the base layer.

Figure 6:
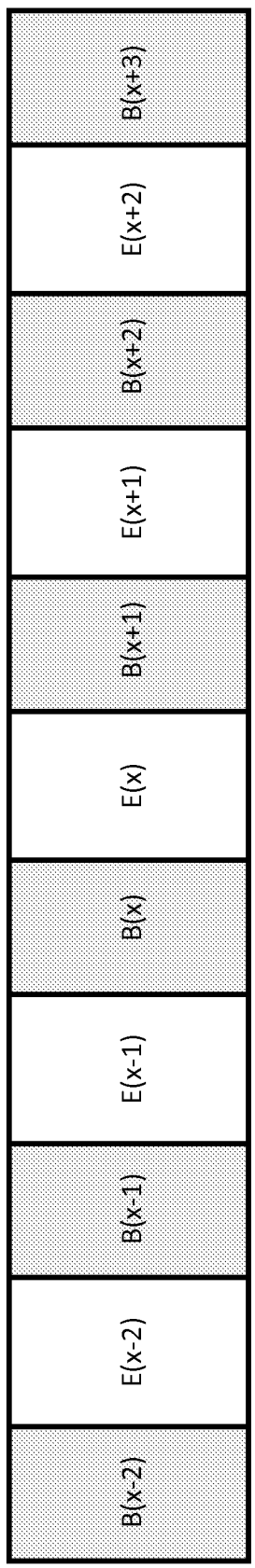
FIG. 6 shows an example of 1-D adaptive filter.

With reference to FIG. 6, by way of example, it will be assumed that a 1-D filter is used to interpolate the enhancement layer (white pixels) from the base layer (shaded pixels), although the process below can be readily extended to derive 2-D non-separable filters of any tap length. Throughout the present disclosure the term 'tap length' means the number of filter taps.

$$\hat{E}(x, y) = \sum_{n=0}^{L-1} h(n) \cdot B(x + n - FO, y) \quad (1)$$

where h(n) is the n-th filter coefficient, L is the filter tap length, $$FO = \frac{L}{2} - 1$$

is the filter offset, and $\hat{E}(x, y)$ and $B(x, y)$ denote the interpolated enhancement layer pixel and the base layer at location (x, y), respectively.

The filter coefficients h(n) are adaptively derived based on minimizing a pre-defined distortion measure. Assuming that the Sum of Squared Error is used as the distortion measure, then the filter coefficients are derived by minimizing $$SSE = \sum_{(x,y)} \left( E(x, y) - \hat{E}(x, y) \right)^2 \quad (2)$$

where $E(x, y)$ and $\hat{E}(x, y)$ are the actual pixel value and the interpolated pixel value (for example, using equation (1)) respectively of the enhancement layer video at location (x, y).

By way of example and not of limitation, the encoder can use a linear optimization process to minimize the prediction error SSE (or any other distortion measure) in order to derive $h^{opt}(n)$. Ultimately, the optimal filter coefficients can be found by solving $$(R^T \cdot R) \cdot h^{opt} = R^T \cdot O \quad (3)$$

where $$h^{opt} = \begin{pmatrix} h^{opt}(0) \\ \vdots \\ h^{opt}(L-1) \end{pmatrix} \quad (4)$$

$$R = \begin{pmatrix} B_0^{pix_0} & \cdots & B_{L-1}^{pix_0} \\ \vdots & & \vdots \\ B_0^{pix_{P-1}} & \cdots & B_{L-1}^{pix_{P-1}} \end{pmatrix} \quad (5)$$

$$O = \begin{pmatrix} E^{pix_0} \\ \vdots \\ E^{pix_{P-1}} \end{pmatrix} \quad (6)$$

In other words, $R^T \cdot R$ is the auto-correlation matrix of all the pixels in the base layer video frame, denoted by $B_0^{pix_0}, \ldots, B_{L-1}^{pix_{P-1}}$, that are involved in the interpolation process; and $R^T \cdot O$ is the cross-correlation between all the pixels in the base layer video involved in the interpolation process, denoted by $B_0^{pix_0}, \ldots, B_{L-1}^{pix_{P-1}}$, and all the enhancement layer pixels being predicted, denoted by $E^{pix_0} \ldots E^{pix_{P-1}}$.

2. AIF and its Use in Multi-Layered Applications

The adaptive interpolation filter process may be used in a multi-layered system to improve prediction for the enhancement layer coding. According to an embodiment of the present disclosure, once derived, the adaptive filter optimum coefficients $h^{opt}(n)$ will be quantized, coded and sent in the bitstream, for example, as part of the metadata information that is signaled to assist and dictate the prediction process in the RPU unit. Throughout the present disclosure, the term "signaling" will mean encoding as part of a bitstream to be transmitted. As shown in FIG. 2, such metadata is derived and sent by the reference processor unit (210) at the encoder, and received and interpreted by the reference processor unit (240) at the decoder. In another embodiment, the adaptive filter coefficients may also be predicted before quantization given the filters used for neighboring partitions. Throughout the present disclosure, the term partition is intended to indicate a segment of a picture, for which parameters can be signaled separately from those of other segments of the picture in a bitstream.

When the adaptive filter $h^{opt}(n)$ is derived over a frame (or a region of interest), while it is optimal for the whole frame, it may not be optimal for all the regions in the frame (or all the sub-regions within the region of interest). Furthermore, quantization introduces distortion to the optimal adaptive filter coefficients $h^{opt}(n)$. In some cases this may cause the adaptive filter to sustain larger distortion than certain fixed filters over certain regions. Throughout the present disclosure, a fixed filter is defined as a filter with fixed coefficients. Moreover, a bit overhead associated with sending the adaptive filter coefficients may be non-trivial, while fixed filters can be signaled much more efficiently (by indicating only a filter index).

Referring to FIG. 2, in accordance with an embodiment of the disclosure, the encoder (220) selects the best filter to use based on a pre-defined coding criterion, such as the Lagrangian rate-distortion cost:

$$J^{adapt} = D^{adapt} + \lambda \cdot r^{adapt} \quad (7)$$

$$J^{fix} = D^{fix} + \lambda \cdot r^{fix} \quad (8)$$

where $D^{adapt}$ and $D^{fix}$ are the distortions (e.g., Sum of Squared Error, Sum of Absolute Difference, subjective quality measure, etc) between the interpolated enhancement layer signal and the original enhancement layer signal using the adaptive filter and the fixed filter, respectively, $r^{adapt}$ and $r^{fix}$ are the bit rate (i.e., number of bits) used to send the adaptive filter coefficients and the fixed filter index, respectively, and $\lambda$ is the Lagrangian lambda factor. The encoder (220) may decide to use the fixed filter if $J^{fix} \leq J^{adapt}$ or use the adaptive filter if $J^{adapt} < J^{fix}$. The decision is signaled in the bitstream. A person skilled in the art of video coding understands that equations (7) and (8) use the rate-distortion cost merely as an example; other coding criteria, such as those that instead or additionally consider system complexity, subjective quality, etc, may also be used.

According to a further embodiment of the disclosure, a method for filter selection is provided, including multiple adaptive filters with various characteristics. By way of example and not of limitation, both 1-D and 2-D adaptive filters can be derived and included in the filter selection process. Other embodiments can be envisaged wherein adaptive filters with different tap lengths and/or different filter coefficient symmetry (as described later) may also be considered. In yet other embodiments, certain linear combinations of these filters may also be considered.

In the frame compatible 3D system of FIG. 2, both the base layer and the enhancement layer contain information about both views. Such information includes the luma and two chroma components. According to some embodiments, the adaptive interpolation filters can be derived and signaled separately for each individual view and each individual component; or, they can be derived jointly for both views and/or all or some of the color components (especially the two chroma components may share the same filter). Furthermore, in accordance with further embodiments, such processing may also happen in the RGB domain or any other color space if desired; and such processing may apply regardless of whether the video content is progressive or interlaced.

Embodiments can be envisaged where the same adaptive filter among the views and/or color components is shared and as a result, the bit overhead associated with signaling the coefficients is reduced. Further referring to FIG. 2, according to an embodiment, the encoder (220) applies adaptive filters to some views and/or color components (which may be the same or different filters) and applies fixed filters on the remaining views and/or color components (which again may be the same or different filters). Such decisions (whether to share the same filter or to use different filters, where to use adaptive filters or fixed filters, etc) can be made by the encoder (220) and signaled to the decoder (250).

As an example, filter decision on the two views can be considered. A person skilled in the art of video coding will understand that the same concept can be easily extended to multiple color components as well. If the same filter (adaptive or fixed) is used on both views, then the rate-distortion cost (or any other coding criterion) takes the form of equation (9), where the bit overhead is for sending only one filter. Alternatively, different filters may be applied on the two views: both views use different adaptive filters; both views use different fixed filters; or one view uses an adaptive filter and the other view uses a fixed filter, etc. The rate-distortion cost for the latter case takes the form of equation (10).

$$J^{joint} = \sum_{view=[0,1]} D_{view}^{joint} + \lambda \cdot r^{joint} \quad (9)$$

$$J^{sep} = \sum_{view=[0,1]} (D_{view}^{sep} + \lambda \cdot r_{view}^{sep}) \quad (10)$$

With further reference to FIG. 2, the encoder (220) chooses a filter configuration that offers, a desired rate distortion cost. Embodiments can be envisaged where such encoder decision may be made at the sequence level, picture level, or region level. For example, the same adaptive filter may be used for both views and/or multiple color components for one picture or one region of one picture, while different adaptive filters may be used for each view and/or each color component for another picture or another region of one picture.

In accordance with an embodiment of the present disclosure, an additional way to reduce the bit overhead associated with sending the filter coefficients is to enforce filter symmetry. As an example, when an L-tap 1-D adaptive filter is used, then the following equation reduces the number of unique filter coefficients by 50%:

$$h(n) = h(L-1-n), n = 0, \ldots, \frac{L}{2} - 1 \quad (11)$$

For 2-D adaptive filters with tap L×K, the filter symmetry may be horizontal only (equation (12)), vertical only (equation (13)), both horizontal and vertical (equation (14)), diagonal (equation (15)), among others. For the 3D system, filter symmetry may be decided on the sequence level, picture level, or region level. In addition, one view may use one type of filter symmetry while the other view uses another type of filter symmetry.

$$h(n, k) = h(L - 1 - n, k), n = 0 \ldots \frac{L}{2} - 1, k = 0 \ldots K - 1 \quad (12)$$

$$h(n, k) = h(n, K - 1 - k), n = 0 \ldots L - 1, k = 0, \ldots, \frac{K}{2} - 1 \quad (13)$$

$$h(n, k) = h(L - 1 - n, K - 1 - k), \quad (14)$$
$$n = 0, \ldots, \frac{L}{2} - 1, k = 0 \ldots \frac{K}{2} - 1$$

$$h(n, k) = h(k, n), n, k = 0, \ldots, \min(L, K) - 1 \quad (15)$$

According to some embodiments of the disclosure, multiple methods to speed up the process of selecting the appropriate interpolation filters (fixed or adaptive) can be used. For example, instead of deriving the adaptive filter coefficients over an entire base layer frame or an entire region of interest (which may be part of a video frame), a sub-region or a number of sub-regions of the base layer video may be used. This reduces the computation required to obtain the auto-correlation and cross-correlation matrices in equation (3). As another example, referring to FIG. 2, the encoder (220) may first examine a prediction quality using certain fixed filters; if the fixed-filter prediction is accurate enough (e.g., the prediction error energy is below a pre-defined threshold), then the encoder may directly use the fixed filters and completely bypass the process of deriving the adaptive filters and choosing the best filter from the adaptive filters and the fixed filters.

With further reference to FIG. 2, in accordance with other embodiments of the disclosure, if different filtering schemes are applied separately for different regions of a video frame, then the encoder (220) may use neighboring regions as a guidance to narrow down the filter choice for the current region. For example, the encoder (220) may perform certain low-complexity image analysis to understand the region characteristics; if the current region has similar characteristics as its neighbors, then the same filters as the neighbors can be used; or, a number of filters that have similar filter characteristics as the filters used in the neighboring regions can be evaluated as filter candidates for the current region. In terms of identifying the neighboring regions, both spatial neighbors (e.g., regions that lie on the top, to the left, or to the top-left of the current region in the same video picture) and temporal neighbors (e.g., regions that are located at the same location as the current region in temporally adjacent but different video pictures) may be considered for this purpose.

A buffered adaptive filter (BAF) scheme is discussed in the above mentioned U.S. Provisional Application No. 61/295,034, filed on Jan. 14, 2010 entitled "Buffered Adaptive Filters" incorporated herein by reference in its entirety. In the BAF scheme, previously sent filters are stored in a filter buffer and used for coding of future video signal. Considerations of various dynamic buffer management methods are also discussed, including how to decide the filter buffer capacities, how to replace existing filters with new filters when the filter buffers are full, how to arrange the order of the filters in the filter buffers, and so on. The concept of the BAF scheme may be directly extended to the 3D and scalable video systems.

According to an embodiment of the present disclosure, the adaptive interpolation filters previously sent are stored in one or more filter buffers, and can be chosen as potential filter candidates for coding of future video signals. Further, certain fixed filters may also be stored in the filter buffers. The filter buffers are dynamically managed such that filters can be added, removed, reordered, and so on, based on considerations for maximal coding efficiency and/or reduced interpolation complexity. Filter buffer management commands (e.g., filter addition/deletion/reordering) can be explicitly signaled by the encoder.

Alternatively, referring to FIG. 2, the encoder (220) and the decoder (250) may use previously agreed upon rules to manage the filter buffers. For example, they may both reorder the filters in the buffers periodically according to filter usage counts (e.g., more frequently used filters are given smaller indices); they may both delete the filters that are the least used when the buffers are full, and so on. The filter buffers may be maintained jointly or separately for each view, and/or for each color component. Also, other embodiments can be envisaged where the filter buffers are maintained jointly or separately for the base layer and the enhancements layers.

Figure 7:
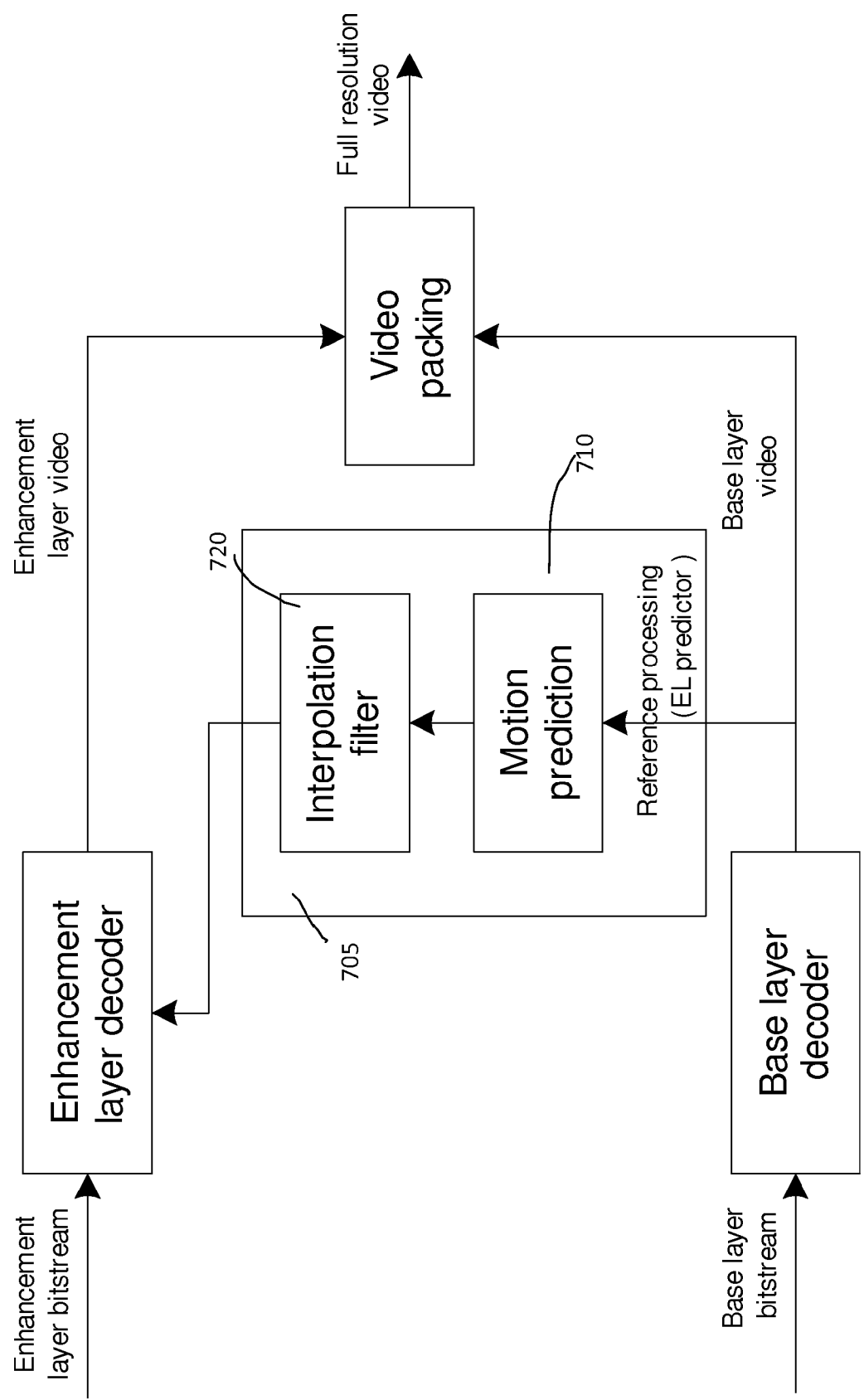
FIG. 7 shows an enhanced reference processing unit in accordance with an embodiment of the disclosure.

According to another embodiment of the present disclosure, other types of processing may be performed between the base layer and the enhancement layer to improve the quality of the enhancement layer prediction. For example, as shown in FIG. 7, both interpolation filter (720) and motion prediction (710) are performed as part of a reference processing (705). For example, in a 3D video system, the motion prediction (710) is used to possibly account for the disparity between the two views. For ease of illustration, this enhanced reference processing scheme is shown as part of (405) the decoder (400) of FIG. 4; however, the same scheme exists in the reference processing unit (305) as shown in the encoder (300) of FIG. 3. Also, motion prediction may be performed globally (for the entire picture) or locally (for a region of a picture). The order of these processing steps (710, 720) is interchangeable. If motion prediction (710) is applied before adaptive interpolation filter (720) is derived (as depicted in FIG. 7), then the pixel values in equation (5) will be $\hat{B}_0^{pix_0}, \ldots, \hat{B}_{L-1}^{pix_{P-1}}$, which represents the base layer video signal after motion prediction (or any other pre-processing step) is performed. In other words, $$\hat{B}(x,y) = B(x+mvx, y+mvy), \quad (16)$$

where (mvx,mvy) is the motion vector.

When motion prediction is used, equation (1) is modified into equation (17). In the same way as in equation (1), it is assumed, as an example, that a 1-D filter is used. According to an embodiment of the present disclosure, motion prediction inside the reference processing unit (705) may also be performed with sub-pixel precision, in which case motion interpolation is used to obtain the sub-pixel values. During motion interpolation, a simple fixed filter (such as the H.264/AVC 6-tap filter, the bilinear filter, etc) may be used initially. After motion prediction, the adaptive filter and filter selection process as described above may be performed following equation (17) and the process outlined above in equations (2) through (10). A combination of the motion prediction process and the filter selection process may be performed iteratively until the selected filters do not change, until a pre-defined quality criterion has been met, until after a certain number of iterations have been completed, or any combination of such criteria. In a further embodiment, complete motion information (e.g. motion vectors, weighting parameters, and information about partitions that utilize different prediction references) from an encoding process, a preliminary encoding process, or other preprocessing processes, can also be utilized in the calculation of the adaptive filters. In other words, equation (17) is considered instead of (1) to derive the adaptive filters for the motion compensated, interpolated enhancement layer.

$$\hat{E}(x, y) = \sum_{n=0}^{L-1} h(n) \cdot B(x + mvx + n - FO, y + mvy) \quad (17)$$

Advanced video encoders often perform image and video analysis to better understand the input video signal before coding is performed. Referring to FIGS. 2A-B, further embodiments can be envisaged wherein the video encoder (220) may apply image segmentation to segment the input picture into a number of regions, each of which possessing certain similar features. Then, the adaptive filter and filter selection process outlined above may be performed on a regional basis, in which each region may independently choose the best filter to use. As an example, assuming a picture, a view, or a color component is partitioned into four regions, with region 0 and region 1 choosing the adaptive filter, and region 2 and region 3 choosing fixed filters. After filter selection is performed, it may be beneficial to refine the adaptive filter using only video signals in region 0 and region 1, as the adaptive filter will only be applied within these two regions.

According to an embodiment of the present disclosure, considering the frame compatible 3D system (300) of FIG. 3, during actual coding of an enhancement layer video block, the prediction block of the enhancement layer video block may be based on an RPU predictor (an upsampled base layer video that is the output of the reference processor unit (305) shown in FIG. 3), or a temporal predictor within the enhancement layer (i.e., the previously coded enhancement layer video stored in the enhancement layer reference picture store (320)). After the current enhancement layer picture is coded, the block-based coding decision may be fed back to the reference processor (305). The reference processor may then refine the adaptive filters by excluding from the filter calculation process those blocks that chose to use the temporal predictors over the RPU predictors. The refined filters may then be used to encode the enhancement layer video again. Such an iterative process may continue until achievable coding gain is below a predefined threshold T, or a maximum number of iterations have been performed or other coding criteria are satisfied. In accordance with further embodiments of the present disclosure, 2D compatible 3D systems and 2D scalable systems using the above-described iterative process can also be envisaged. Yet other embodiments to improve the speed and complexity of such iterative process are described below.

Figure 8:
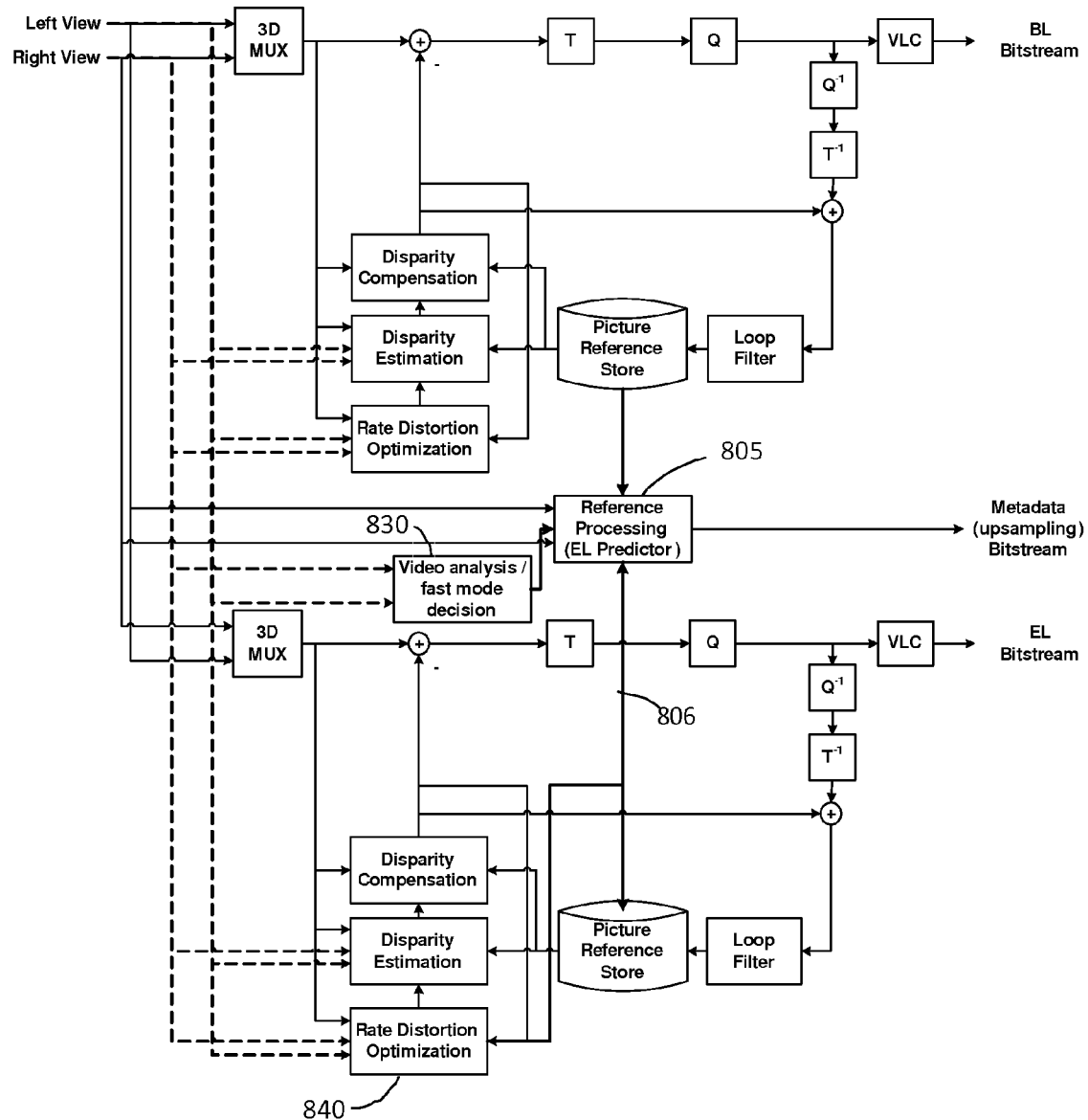
FIG. 8 shows a selective reference processing at the encoder.

The iterative process described above iterates between adaptive filter calculation and full encoding of the enhancement layer video. In another embodiment, instead of performing full encoding of the enhancement layer, pre-analysis and/or fast mode decision may be used during the iterative process to identify blocks or regions that are more likely to use temporal predictor rather than RPU predictor. These blocks or regions may then be excluded from calculation of the adaptive filters. As an example, assume that pre-analysis is used to identify two regions of an enhancement layer picture, with region 0 being more likely to use the temporal predictors and region 1 being more likely to use RPU predictors. Then, only video signal from region 1 may be used to calculate the adaptive filters. These adaptive filters may then be used to perform a "light-weight" enhancement layer coding pass during which fast mode decision is used in place of full mode decision based on rate distortion optimization. Based on the encoding results of the "light-weight" coding pass, region 1 may be refined to contain a more precise estimate of video signal that will likely use RPU predictors. The adaptive filters may then also be refined based on refined region 1. These refined adaptive filters are then fed back into another coding pass using more sophisticated mode decision. And the iterative process may continue until one or more of the criteria mentioned above are met. FIG. 8 depicts a selective reference processing method, where the blocks/regions selected to be used in reference processing may be determined by performing pre-analysis or fast mode decision (830), or by taking the output of the rate distortion optimization unit (840) into a reference processing module (805), as shown by an arrow (806).

Figure 9:
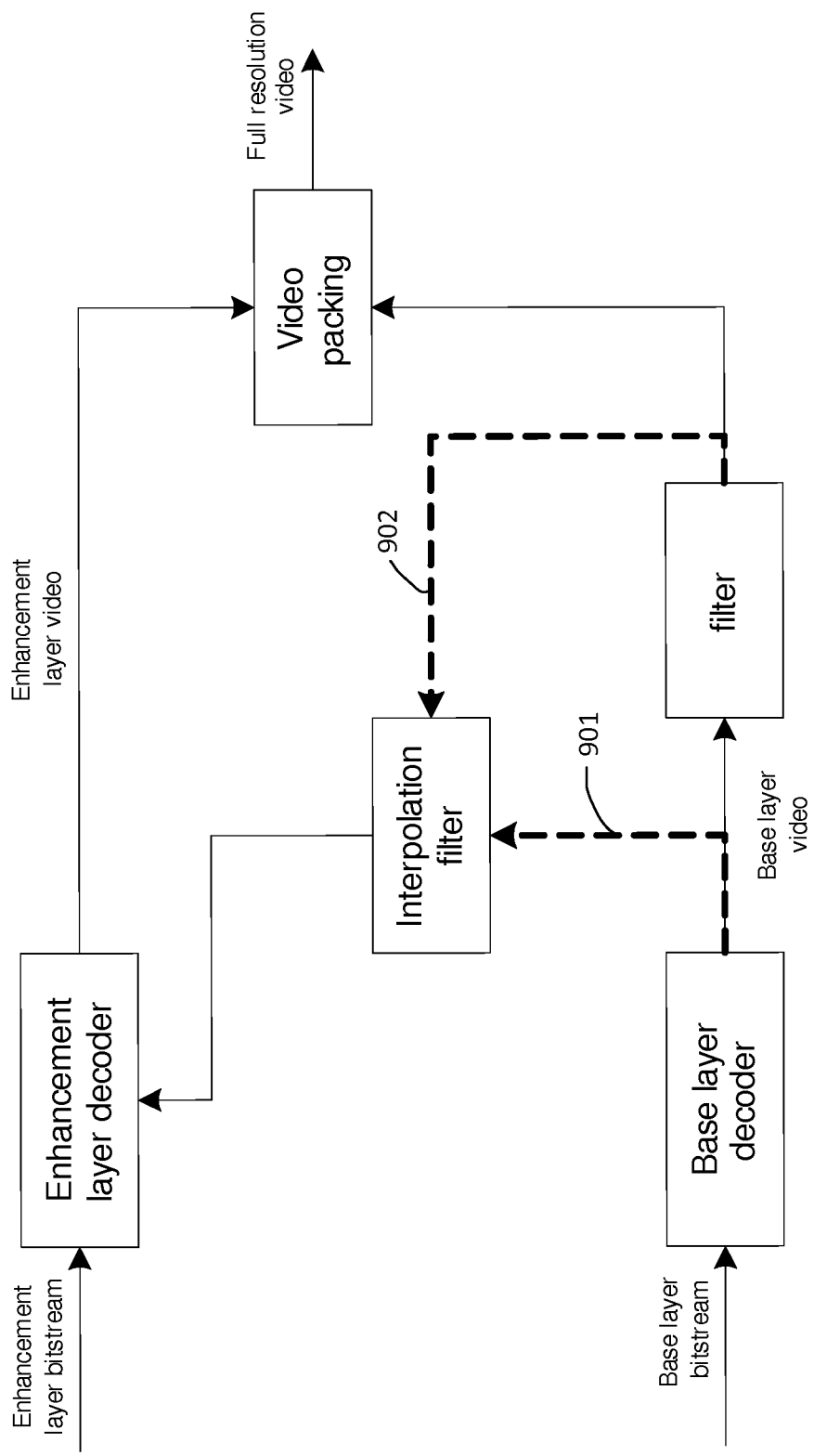
FIG. 9 shows a filtering of the base layer video.

In accordance with further embodiments of the present disclosure, as shown in FIG. 9, all of the adaptive filtering mechanisms described so far can also be applied to the base layer video to improve the base layer video quality. Such filtering can be applied outside of an RPU (903) process loop (shown with an arrow (901)); or, alternatively, it can be applied inside of the RPU (903) process loop (shown with an arrow (902)), such that the filtered base layer video (which has better quality) is used during interpolation to obtain the prediction signal for the enhancement layer coding. When the base layer video is filtered, all of the above considerations for filtering the enhancement layer (encoder side filter selection and signaling, buffered adaptive filters, etc) can be applied as well. In another embodiment, calculation of the adaptive filters used in the RPU (903) process and calculation of the adaptive filters in a filter (904) may be decided iteratively.

While various embodiments of the present disclosure have been described using the example of a frame compatible full resolution 3D system, where both the base layer and the enhancement layer video contain video signals pertaining to the first view and the second view, teachings of the present disclosure are readily applicable to other 3D and also 2D scalable systems. For example, in a 2D compatible 3D system, where the base layer contains a video signal pertaining to the first view and the enhancement layer contains a video signal pertaining to the second view, a reference processing unit may also be used to apply adaptive and/or fixed filtering to the encoded base layer video; the processed base layer video (which represents the first view) may then be used as predictors for coding of the enhancement layer video (which represents the second view). In a 2D scalable system, the base layer may contain information about a 2D image at a certain resolution, while the enhancement layer may contain additional information that would allow an increase in that resolution, while the reference processing unit may provide a mechanism of predicting the enhancement layer samples from the base layer samples using similar mechanisms as presented in the 3D case. The various teachings of the present disclosure, including choosing best performing filters based on a coding criterion, applying the adaptive and/or fixed filters separately and/or jointly for different color components, buffering the adaptive filters, applying motion prediction (e.g., view disparity compensation) to encoded base layer video, iteratively calculating the adaptive filters and coding the enhancement layer video, and so on, are readily extensible to such systems. In addition, the teachings of this disclosure can be extended to multiview encoding systems that contain more than two views. For example, the teachings may be applied if the multiple views are present in a frame compatible format. The teachings may also be applied for both 3D stereoscopic and multiview encoding systems, such as that described in U.S. Provisional Application 61/223,027, where more than one enhancement layer may be present. In that case, a reference processing unit that contains the teachings described in the present disclosure may be used to obtain a predictor for each enhancement layer from the previously encoded layer or layers. The teachings in the present disclosure may also be applied to various 3D video systems and 2D scalable video systems comprising more than one enhancement layer. An example of a frame compatible 3D stereoscopic system having more than one enhancement layer is illustrated in FIG. 10.

The methods and systems described in the present disclosure may be implemented in hardware, software, firmware or combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA).

An embodiment of the present invention may relate to one or more of the example embodiments, enumerated below.

1. A multi-layered video encoding system, comprising:
    a base layer, comprising a base layer video encoder;
    at least one enhancement layer, associated with the base layer, the at least one enhancement layer comprising an enhancement layer video encoder; and
    an encoder processing module to filter an output of the base layer video encoder to form a processed encoder output and input the processed encoder output into the enhancement layer video encoder as an enhancement layer estimate.
2. A multi-layered video system, comprising:
    a base layer, comprising a base layer video encoder and a base layer video decoder;
    at least one enhancement layer, associated with the base layer, the at least one enhancement layer comprising an enhancement layer video encoder and an enhancement layer video decoder;
    an encoder processing module to filter an output of the base layer video encoder to form a processed encoder output and input the processed encoder output into the enhancement layer video encoder as an enhancement layer estimate; and
    a decoder processing module to process an output of the base layer video decoder to form a processed decoder output to reconstruct the enhancement layer and input the processed decoder output into the enhancement layer video decoder.
3. The multi-layered video system of Enumerated Example Embodiment 1 or 2, wherein the encoder processing module comprises adaptive filters to filter the base layer video output and to estimate the enhancement layer video signal.
4. The multi-layered video system of Enumerated Example Embodiment 3, wherein coefficients of the adaptive filters are derived based on statistics of an input video signal input to the base layer video encoder and to the enhancement layer video encoder.
5. The multi-layered video system of Enumerated Example Embodiment 3, wherein coefficients of the adaptive filters are derived based on a distortion measure between the enhancement layer video signal and an estimated enhancement layer video signal.
6. The multi-layered video system of Enumerated Example Embodiment 5, wherein the distortion measure is selected from a sum of squared errors, a sum of absolute differences, a subjective quality measure or a combination thereof.
7. The multi-layered video system of Enumerated Example Embodiment 3, wherein filter coefficients corresponding to a partition of an input video signal are predicted using filters derived for neighboring partitions of the partition.
8. The multi-layered video system of Enumerated Example Embodiment 3, wherein coefficients of the adaptive filters are derived over a frame, a region of interest, regions in the frame or a subset of the region of interest.
9. The multi-layered video system of Enumerated Example Embodiment 1 or 2, wherein the encoder processing module comprises adaptive filters and fixed filters.
10. The multi-layered video system of Enumerated Example Embodiment 9, wherein the encoder processing module selects a best performing filter among the adaptive filters and the fixed filters based on a coding criterion.
11. The multi-layered video system of Enumerated Example Embodiment 10, where the coding criterion is a Lagrangian rate-distortion cost.
12. The multi-layered video system of Enumerated Example Embodiment 10, where the coding criterion is based on system complexity, subjective quality or a combination thereof.
13. The multi-layered video system of Enumerated Example Embodiment 3, wherein the encoder processing module comprises one or more of one-dimensional adaptive filters, two-dimensional adaptive filters, adaptive filters with different tap lengths, and adaptive filters with different coefficient symmetry.
14. The multi-layered video system of Enumerated Example Embodiment 13, wherein the encoder processing module selects a best performing filter among the one-dimensional adaptive filters, the two-dimensional adaptive filters, the adaptive filters with different tap lengths, the adaptive filters with different coefficient symmetry or a linear combination thereof based on a coding criterion.
15. The multi-layered video system of Enumerated Example Embodiment 3, wherein the adaptive filters are one-dimensional with filter coefficient symmetry.
16. The multi-layered video system of Enumerated Example Embodiment 3, wherein the adaptive filters are two-dimensional with filter coefficient symmetry.
17. The multi-layered video system of Enumerated Example Embodiment 16, wherein the filter symmetry is one of horizontal only, vertical only, both horizontal and vertical, or diagonal.
18. The multi-layered video system of Enumerated Example Embodiment 1 or 2, wherein each of the base layer video encoder and the enhancement layer video encoder receives two inputs indicative of a first view and a second view.
19. The multi-layered video system of Enumerated Example Embodiment 18, further comprising adaptive filters, wherein coefficients of the adaptive filters are derived separately for each of the first view and the second view and each color component of the first view and the second view.
20. The multi-layered video system of Enumerated Example Embodiment 18, wherein coefficients of the adaptive filters are derived jointly for both the first view and the second view and/or all or some of the color components of the first view and the second view.
21. The multi-layered video system of Enumerated Example Embodiment 18, wherein the same filter is used for two chroma components of each or both of the first view and the second view.

22. The multi-layered video system of Enumerated Example Embodiment 18, wherein the encoder processing module further comprises fixed filters.
23. The multi-layered video system of Enumerated Example Embodiment 22, wherein for each of the first view, the second view and/or respective color components of the first view and the second view, the encoder processing module selects a best performing filter among the adaptive filters and the fixed filters based on a coding criterion.
24. The multi-layered video system of Enumerated Example Embodiment 23, wherein calculation and evaluation of the adaptive filters is skipped if a performance of the fixed filters meets a predefined threshold.
25. The multi-layered video system of Enumerated Example Embodiment 23, wherein the best performing filter selection is performed at level selected from one or more of a sequence level, picture level, and region level.
26. The multi-layered video system of Enumerated Example Embodiment 23, wherein the coding criterion is a rate-distortion cost function.
27. A multi-layered video encoding system, comprising:
   a base layer, comprising a base layer video encoder;
   at least one enhancement layer, associated with the base layer, the at least one enhancement layer comprising an enhancement layer video encoder; and
   an encoder processing module to process an output of the base layer video encoder to form an encoder processed output and input the encoder processed output into the enhancement layer video encoder, the encoder processing module comprising adaptive filters to estimate an enhancement layer video signal based on a base layer video signal, and
   one or more encoding filter buffers where adaptive filters derived for previous signals are stored and used for encoding of future video signals.
28. A multi-layered video decoding system, comprising:
   a base layer, comprising a base layer video decoder;
   at least one enhancement layer, associated with the base layer, the at least one enhancement layer comprising an enhancement layer video decoder; and
   a decoder processing module to process an output of the base layer video decoder to form a decoder processed output and input the decoder processed output into the enhancement layer video decoder, the decoder processing module comprising adaptive filters to reconstruct an enhancement layer video signal, and
   one or more decoding filter buffers where adaptive filters derived for previous signals are stored and used for decoding of future video signals.
29. A multi-layered video system, comprising:
   a base layer, comprising a base layer video encoder and a base layer video decoder;
   at least one enhancement layer, associated with the base layer, the at least one enhancement layer comprising an enhancement layer video encoder and an enhancement layer video decoder;
   an encoder processing module to process an output of the base layer video encoder to form an encoder processed output and input the encoder processed output into the enhancement layer video encoder, the encoder processing module comprising adaptive filters to estimate an enhancement layer video signal based on a base layer video signal;
   a decoder processing module to process the output of the base layer video decoder to form a decoder processed output and input the decoder processed output into the enhancement layer video decoder, the decoder comprising adaptive filters to reconstruct the enhancement layer video signal based on the base layer video signal;
   one or more encoding filter buffers where adaptive filters derived for previous signals are stored and used for encoding of future video signals; and
   one or more decoding filter buffers where adaptive filters derived for previous signals are stored and used for decoding of future video signals.
30. The multi-layered video system of Enumerated Example Embodiments 27 or 29, wherein the one or more encoding filter buffers further comprise fixed filters.
31. The multi-layered video system of Enumerated Example Embodiments 28 or 29, wherein the one or more decoding filter buffers further comprise fixed filters.
32. The multi-layered video system of Enumerated Example Embodiments 27, 28 or 29, wherein the one or more encoding filter buffers and the one or more decoding filter buffers are dynamically managed filter buffers.
33. The multi-layered video system of Enumerated Example Embodiment 32, wherein the dynamic filter buffers are dynamically managed through at least one of a filter addition, filter deletion, and filter reordering.
34. The multi-layered video system of Enumerated Example Embodiment 32 or 33, wherein filter buffer management commands are signaled by the base layer video encoder and/or the enhancement video encoder.
35. The multi-layered video system of Enumerated Example Embodiment 32 or 33, wherein dynamic filter buffer management is based on filter buffer management rules agreed upon between the encoder processing module and the decoder processing module.
36. The multi-layered video system of Enumerated Example Embodiment 35, wherein the filter buffer management rules comprise reordering of filters within the encoder filter buffer and the decoder filter buffer according to filter usage counts.
37. The multi-layered video system of Enumerated Example Embodiment 36, wherein more frequently used filters are given smaller indices.
38. The multi-layered video system of Enumerated Example Embodiment 33, wherein filters that are the least used are deleted from corresponding encoder filter buffers and corresponding decoder filter buffers when the corresponding encoder filter buffers and the corresponding decoder filter buffers are full.
39. The multi-layered video system of Enumerated Example Embodiment 29, wherein each of the base layer video encoder and the enhancement layer video encoder receives two inputs indicative of a first view and a second view, the one or more encoder filter buffers and the one or more decoder filter buffers being maintained separately for each of the first view or the second view or jointly.
40. The multi-layered video system of Enumerated Example Embodiment 29, wherein each of the base layer video encoder and the enhancement layer video encoder receives video signals indicative of one or more color components, the one or more encoder filter buffers and the one or more decoder filter buffers being maintained separately for each of the one or more color components or jointly.
41. The multi-layered video system of Enumerated Example Embodiment 29, wherein the one or more encoder filter buffers and the one or more decoder filter buffers are maintained separately for each of the base layer and the at least one enhancement layer or jointly.
42. The multi-layered video system of any one of Enumerated Example Embodiments 4-41, wherein:

the base layer video signal is processed to form a processed base layer video signal; and the adaptive filters are derived based on the processed base layer video signal.

43. The multi-layered video system of Enumerated Example Embodiment 42, wherein the processed base layer video signal is a motion prediction of the base layer video signal.

44. The multi-layered video system of Enumerated Example Embodiment 43, wherein the motion prediction is performed globally and or locally.

45. The multi-layered video system of Enumerated Example Embodiment 43, wherein the motion prediction is performed with sub-pixel precision.

46. The multi-layered video system of Enumerated Example Embodiment 43, wherein a combination of adaptive filtering and motion prediction is performed iteratively until an obtained filter does not change, a quality criterion is met, a certain number of iterations is completed or a combination thereof.

47. The multi-layered video system of Enumerated Example Embodiment 4, wherein the enhancement layer further comprises temporal predictors of a current enhancement layer video based on a previously coded enhancement layer video.

48. The multi-layered video system of Enumerated Example Embodiment 47, wherein the enhancement layer estimation is video-block based, some blocks being predicted based on RPU predictors, some blocks being predicted based on temporal predictors, and some blocks being predicted based on a combination thereof.

49. The multi-layered video system of Enumerated Example Embodiment 48, wherein an iterative enhancement layer coding is performed wherein:

the adaptive filters are calculated by eliminating from calculation, at least in part, the enhancement layers blocks predicted based on temporal predictors and the corresponding base layer blocks;

the calculated adaptive filters are used to encode the enhancement layer again; and enhancement layer coding is re-iterated until achievable coding gain is below a predefined threshold or a certain number of iterations is performed.

50. The multi-layered video system of Enumerated Example Embodiment 48, wherein a pre-analysis is performed to identify the enhancement video-blocks likely to be predicted using temporal predictors.

51. The multi-layered video system of Enumerated Example Embodiment 50, wherein the identified enhancement blocks likely to be predicted using temporal prediction are excluded, at least in part, from the adaptive filters derivation.

52. The multi-layered video system of any one of Enumerated Example Embodiments 3-51, wherein adaptive filtering is applied to the base layer video and the corresponding adaptive filter coefficients are signaled.

53. The multi-layered video system of Enumerated Example Embodiment 52, wherein the base layer video filtering is applied outside of or inside of the RPU process loop.

54. A multi-layered video encoding method, comprising:
base layer video encoding a base layer video signal;
processing the base layer video signal;
enhancement layer video encoding an enhancement layer video signal;
adaptive filtering the base layer video signal to estimate the enhancement layer video signal;
filtering the base layer video signal to estimate the enhancement layer video signal using fixed filters;
establishing a coding criterion;
based on the coding criterion, establishing qualities of an enhancement layer video signal estimation for both the adaptive filtering and the fixed filtering;
selecting a best performing filter based on the established qualities of estimation;
signaling the best performing filter; and
adopting the best performing filter and the processed base layer video signal for the enhancement video layer encoding.

55. A multi-layered video method, comprising:
base layer video encoding a base layer video signal;
processing the base layer video signal;
enhancement layer video encoding an enhancement layer video signal;
adaptive filtering the base layer video signal to estimate the enhancement layer video signal;
filtering the base layer video signal to estimate the enhancement layer video signal using fixed filters;
establishing a coding criterion;
based on the coding criterion, establishing qualities of an enhancement layer video signal estimation for both the adaptive filtering and the fixed filtering;
selecting a best performing filter based on the established qualities of estimation;
signaling the best performing filter;
adopting the best performing filter and the processed base layer video signal for the enhancement video layer encoding.
base layer video decoding the base layer video signal to form a decoded video signal;
processing the base layer decoded video signal;
adopting the processed base layer decoded video signal and the signaled best performing filter for enhancement layer video decoding; and
enhancement layer video decoding the enhancement layer video signal.

56. A multi-layered video encoding method, comprising:
base layer video encoding a base layer video signal;
processing the base layer video signal;
enhancement layer video encoding an enhancement layer video signal;
performing motion prediction on the base layer video signal to form a predicted base layer video signal;
adaptive filtering the predicted base layer video signal to estimate the enhancement layer video signal;
filtering the predicted base layer video signal to estimate the enhancement layer video signal using fixed filters;
establishing a coding criterion;
based on the coding criterion, establishing qualities of the enhancement layer video signal estimation for both the adaptive filtering and the fixed filtering;
selecting a best performing filter based on the established qualities of estimation;
signaling the best performing filter, and
adopting the best performing filter and the processed base layer video signal for the enhancement video layer encoding.

57. A multi-layered video method, comprising:
base layer video encoding a base layer video signal;
processing the base layer video signal;
enhancement layer video encoding an enhancement layer video signal;
performing motion prediction on the base layer video signal to form a predicted base layer video signal;
adaptive filtering the predicted base layer video signal to estimate the enhancement layer video signal;

filtering the predicted base layer video signal to estimate the enhancement layer video signal using fixed filters;
establishing a coding criterion;
based on the coding criterion, establishing qualities of the enhancement layer video signal estimation for both the adaptive filtering and the fixed filtering;
selecting a best performing filter based on the established qualities of estimation;
signaling the best performing filter;
adopting the best performing filter and the processed base layer video signal for the enhancement video layer encoding;
base layer video decoding the base layer video signal;
processing the base layer decoded video signal;
adopting the processed base layer decoded video signal and the signaled best performing filter for enhancement layer video decoding; and
enhancement layer video decoding the enhancement layer video signal.

58. A multi-layered video encoding method, comprising:
base layer video encoding a base layer video signal;
processing the base layer video signal;
enhancement layer video encoding an enhancement layer video signal;
filtering the base layer video signal to estimate the enhancement layer video signal using fixed filters; and
establishing a coding criterion to evaluate a quality of the enhancement layer video signal estimation;
if the coding criterion is met by the fixed filtering:
signaling the fixed filters; and
adopting the fixed filters and the processed base layer video signal for the enhancement video layer encoding;
else
adaptive filtering the base layer video signal to estimate the enhancement layer video signal;
based on the coding criterion, establishing qualities of the enhancement layer video signal estimation for both the adaptive filtering and the fixed filtering;
selecting a best performing filter based on the established qualities of estimation;
signaling the best performing filter; and
adopting the best performing filter and the processed base layer video signal for the enhancement video layer encoding.

59. A multi-layered video method, comprising:
base layer video encoding a base layer video signal;
processing the base layer video signal;
enhancement layer video encoding an enhancement layer video signal;
filtering the base layer video signal to estimate the enhancement layer video signal using fixed filters; and
establishing a coding criterion to evaluate a quality of an enhancement layer video signal estimation;
if the coding criterion is met by the fixed filtering:
signaling the fixed filters; and
adopting the fixed filters and the processed base layer video signal for the enhancement video layer encoding
else
adaptive filtering the base layer video signal to estimate the enhancement layer video signal;
based on the coding criterion, establishing qualities of the enhancement layer video signal estimation for both the adaptive filtering and the fixed filtering;
selecting a best performing filter based on the established qualities of estimation;
signaling the best performing filters; and
adopting the best performing filters and the processed base layer video signal for the enhancement video layer encoding;
base layer video decoding the base layer video signal;
processing the base layer decoded video signal;
adopting the processed base layer decoded video signal and the signaled filter for enhancement layer video decoding, and
enhancement layer video decoding the enhancement layer video signal.

60. The multi-layered video method of any one of Enumerated Example Embodiments 54-59, wherein the coding criterion is a Lagrangian rate distortion cost.

61. A multi-layered video encoding method, comprising:
base layer video encoding a base layer video signal;
processing the base layer video signal;
enhancement layer video encoding an enhancement layer video signal;
establishing one or more image characteristics criteria;
identifying a number of neighboring regions of a current region of an enhancement layer video picture meeting the same one or more image characteristics criteria as the current region of the enhancement layer video picture;
selecting the same filters for the current region of the enhancement layer video picture as filters adopted for filtering the number of neighboring regions meeting the same one or more image characteristics criteria;
signaling the selected filters; and
adopting the selected filters and the processed base layer video signal for the enhancement video layer encoding.

62. A multi-layered video method, comprising:
base layer video encoding a base layer video signal;
processing the base layer video signal;
enhancement layer video encoding an enhancement layer video signal;
establishing one or more image characteristics criteria;
identifying a number of neighboring regions of a current region of an enhancement layer video picture meeting the same one or more image characteristics criteria as the current region of the enhancement layer video picture;
selecting the same filters for the current region of the enhancement layer video picture as filters adopted for filtering the number of neighboring regions meeting the same one or more image characteristics criteria;
signaling the selected filters;
adopting the selected filters and the processed base layer video signal the enhancement video layer encoding;
base layer video decoding the base layer video signal to form a base layer decoded video signal;
processing the base layer decoded video signal;
adopting the processed base layer decoded video signal and the signaled filters for enhancement layer video decoding; and
enhancement layer video decoding the enhancement layer video signal to form a decoded second view.

63. A multi-layered video encoding method, comprising:
base layer video encoding a base layer video signal;
processing the base layer video signal;
enhancement layer video encoding an enhancement layer video signal;
establishing one or more image characteristics criteria;
identifying a number of neighboring regions of a current region of an enhancement layer video picture meeting the same one or more image characteristics criteria as the current region of the enhancement layer video picture;
establishing one or more filter characteristics criteria;
from a set of filters, selecting a number of filters for the current region of the enhancement layer video picture meeting the same one or more filter characteristics criteria as filters adopted to filter the number of neighboring regions meeting the same one or more image characteristics criteria;
signaling the selected number of filters; and
adopting the selected filters and the processed base layer video signal for the enhancement video layer encoding.

64. A multi-layered video method, comprising:
base layer video encoding a base layer video signal;
processing the base layer video signal;
enhancement layer video encoding an enhancement layer video signal;
establishing one or more image characteristics criteria;
identifying a number of neighboring regions of a current region of an enhancement layer video picture meeting the same one or more image characteristics criteria as the current region of the enhancement layer video picture;
establishing one or more filter characteristics criteria;
from a set of filters, selecting a number of filters for the current region of the enhancement layer video picture meeting the same one or more filter characteristics criteria as filters adopted to filter the number of neighboring regions meeting the same one or more image characteristics criteria;
signaling the selected number of filters;
adopting the selected filters and the processed base layer video for the enhancement video layer encoding;
base layer video decoding the base layer video signal to form a decoded video signal;
processing the base layer decoded video signal;
adopting the processed base layer decoded video signal and the signaled filters for enhancement layer video decoding; and
enhancement layer video decoding the enhancement layer video signal.

65. The multi-layered video method of any one of Enumerated Example Embodiments 61-64, wherein the neighboring regions are temporal neighbors, spatial neighbors or both temporal and spatial neighbors.

66. The multi-layered video method of any of Enumerated Example Embodiments 55, 57, 60, 62, or 64, wherein each of the base layer video signal and the enhancement layer video signal comprises a first view and a second view.

67. The multi-layered video system of any of Enumerated Example Embodiments 1-27 or 29-53, wherein the base layer and the at least one enhancement layer receive a frame compatible 3D video signal, a 2D compatible 3D video signal or a 2D scalable video signal.

68. An encoder for encoding video signals according to the method recited in one or more of Enumerated Example Embodiments 54, 56, 58, 60, 61, 63, 65, or 66.

69. An apparatus for encoding video signals according to the method recited in one or more of Enumerated Example Embodiments 54, 56, 58, 60, 61, 63, 65, or 66.

70. A system for encoding video signals according to the method recited in one or more of Enumerated Example Embodiments 54, 56, 58, 60, 61, 63, 65, or 66.

71. A computer-readable medium containing a set of instructions that causes computer to perform the method recited in one or more of Enumerated Example Embodiments 54-68.

72. Use of the method recited in one or more of Enumerated Example Embodiments 54, 56, 58, 60, 61, 63, 65, or 66 to encode video signals.

73. Use of the method recited in one or more of the Enumerated Example Embodiments 55, 56, 57, 59, 60, 62, 64, 65, or 66 to decode video signals.

The examples set forth above are provided to give those of ordinary skill in the art a complete disclosure and description of how to make and use the embodiments of the adaptive interpolation filters for frame compatible 3D delivery, and are not intended to limit the scope of what the inventors regard as their disclosure. Modifications of the above-described modes for carrying out the disclosure may be used by persons of skill in the video art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

LIST OF REFERENCES

[1] D. C. Hutchison, "Introducing DLP 3-D TV", http://www.dlp.com/downloads/Introducing DLP 3D HDTV Whitepaper.pdf.

[2] Advanced video coding for generic audiovisual services, http://www.itu.int/rec/recommendation.asp?type=folders&lang=e&parent=T-REC-H.264, March 2003.

[3] Y. Vatis and J. Ostermann, "Comparison of complexity between two-dimensional non-separable adaptive interpolation filter and standard wiener filter", ITU-T SGI 6/Q.6 Doc. VCEG-AA11, Nice, France, October 2005.

[4] S. Wittmann, T. Wedi, "Separable Adaptive Interpolation Filter for Video Coding," Proc. ICIP 2008, IEEE International Conference on Image Processing, San Diego, Calif., October 2008.

[5] D. Rusanovskyy, K. Ugur, J. Lainema, "Adaptive Interpolation with Directional Filters," ITU-T SGI 6/Q.6 Doc. VCEG-AG21, Shenzhen, China, October 2007.

[6] Y. Ye and M. Karczewicz, "Enhanced Adaptive Interpolation Filter," ITU-T/SG16/Q.6 document C.464, Geneva, Switzerland, April 2008.

[7] Y. Vatis, B. Edler, D. T. Nguyen, and J. Ostermann, "Two-dimensional non-separable adaptive Wiener interpolation filter for H.264/AVC", ITU-T SGI 6/Q.6 Doc. VCEG-Z17, Busan, Korea, April 2005.

What is claimed is:

1. A multi-layered video system adapted to receive an input video signal, the input video signal having an original base layer video signal and at least one original enhancement layer video signal, the multi-layered video system comprising:
    a base layer, comprising a base layer video encoder, wherein the base layer video encoder is adapted to receive the original base layer video signal;
    at least one enhancement layer, associated with the base layer, the at least one enhancement layer comprising an enhancement layer video encoder, wherein each enhancement layer video encoder is adapted to receive one or more of the at least one original enhancement layer video signal; and
    an encoder processing module comprising at least one adaptive filter to filter an output of the base layer video encoder to form a processed encoder output and input the processed encoder output into at least one of the enhancement layer video encoders as an enhancement layer estimate signal,
    wherein:
    the original base layer video signal and the at least one enhancement layer video signal are adapted to be segmented into a plurality of partitions,
    the at least one adaptive filter is selected for applying to a full set or subset of partitions in the plurality of partitions,
    the at least one adaptive filter comprises filter coefficients, wherein the filter coefficients of the at least one adaptive filter are adjusted, prior to the applying of the at least one adaptive filter, based on at least one of image information in each partition in the full set or subset of partitions and image information in one or more partitions neighboring each partition in the full set or subset of partitions,
    the neighboring partitions comprise partitions from temporal neighbors of the full set or subset of partitions, partitions from spatial neighbors of the full set or subset of partitions, and partitions from inter-layer neighbors of the full set or subset of partitions, and
    the image information in the inter-layer neighbors comprises texture and motion information from the at least one enhancement layer associated with the full set or subset of partitions, wherein the enhancement layer further comprises temporal predictors of a current enhancement layer video based on a previously coded enhancement layer video, wherein a pre-analysis is performed to identify the enhancement video-blocks likely to be predicted using temporal predictors, and wherein the adaptive filters are calculated by eliminating from calculation, at least in part, the enhancement video blocks likely to be predicted using temporal predictors.

2. The multi-layered video system as recited in claim 1, the base layer further comprising a base layer video decoder and each enhancement layer in the at least one enhancement layer further comprising an enhancement layer video decoder, the multi-layered video system further comprising:
    a decoder processing module to process an output of the base layer video decoder to form a processed decoder output to reconstruct the enhancement layer and input the processed decoder output into at least one of the enhancement layer video decoders,
    wherein:
    the base layer video decoder is adapted to receive an output of the base layer video encoder and each enhancement layer video decoder is adapted to receive an output of one or more of the enhancement layer video encoders.

3. The multi-layered video system as recited in claim 1, wherein the filter coefficients of the at least one adaptive filter are derived over a frame, a region of interest, regions in the frame, or a subset of the region of interest.

4. The multi-layered video system as recited in claim 3, wherein the filter coefficients of the at least one adaptive filter are derived based on statistics of an input video signal input to the base layer video encoder and to the enhancement layer video encoder.

5. The multi-layered video system as recited in claim 3, wherein the filter coefficients of the at least one adaptive filter are derived based on a distortion measure between each of the at least one original enhancement layer video signals and an estimated enhancement layer video signal.

6. The multi-layered video system as recited in claim 3, wherein the filter coefficients corresponding to a partition of an input video signal are predicted using filters derived for neighboring partitions of the partition.

7. The multi-layered video system as recited in claim 1, wherein the encoder processing module further comprises at least one fixed filter.

8. The multi-layered video system as recited in claim 7, wherein the at least one fixed filter is applied to a particular partition in the plurality of partitions, and wherein the filter coefficients of the at least one adaptive filter, prior to the applying, are adjusted based on each partition in the full set or subset of partitions on which the at least one adaptive filter will be applied and not adjusted based on the particular partition on which the at least one fixed filter will be applied.

9. The multi-layered video system as recited in claim 3, wherein the encoder processing module comprises one or more of one-dimensional adaptive filters, two-dimensional adaptive filters, adaptive filters with different tap lengths, and adaptive filters with different coefficient symmetry.

10. The multi-layered video system as recited in claim 1, wherein each of the base layer video encoder and the enhancement layer video encoder receives two inputs indicative of a first view and a second view.

11. The multi-layered video system as recited in claim 10, further comprising adaptive filters, wherein filter coefficients of the adaptive filters are derived separately for each of the first view and the second view and each color component of the first view and the second view.

12. The multi-layered video system as recited in claim 10, wherein filter coefficients of the adaptive filters are derived jointly for both the first view and the second view and at least some of the color components of the first view and the second view.

13. The multi-layered video system as recited in claim 10, wherein the same filter is used for two chroma components of each or both of the first view and the second view.

14. The multi-layered video system as recited in claim 4, wherein the processed base layer video signal comprises a motion prediction of the output of the base layer encoder.

15. The multi-layered video system as recited in claim 14, wherein the motion prediction comprises at least one of a globally performed or locally performed motion prediction.

16. The multi-layered video system as recited in claim 14, wherein a combination of adaptive filtering and motion prediction is performed iteratively until an obtained filter does not change, a quality criterion is met, a certain number of iterations is completed or a combination thereof, wherein the quality criterion relates to a distortion between the processed base layer video signal and the original enhancement layer video signal.

17. The multi-layered video system as recited in claim 14, wherein the enhancement layer estimation is video-block based, some blocks being predicted based on reference processing unit (RPU) predictors, some blocks being predicted based on the temporal predictors, and some blocks being predicted based on a combination thereof, wherein the RPU predictors comprise information on base layer to enhancement layer prediction.

18. The multi-layered video system as recited in claim 1, wherein an iterative enhancement layer coding is performed wherein:
- the adaptive filters are calculated by eliminating from calculation, at least in part, the enhancement layers blocks predicted based on temporal predictors and the corresponding base layer blocks;
- the calculated adaptive filters are used to encode the enhancement layer again; and
- enhancement layer coding is re-iterated until achievable coding gain is below a predefined threshold or a certain number of iterations is performed.

19. The multi-layered video system as recited in claim 3, wherein adaptive filtering is applied to the base layer video and the corresponding adaptive filter coefficients are signaled.

20. The multi-layered video system as recited in claim 19, wherein the base layer video filtering can be applied prior to or subsequent to base layer to enhancement layer prediction.

21. The multi-layered video system as recited in claim 1, wherein the base layer and the at least one enhancement layer receive at least one of a frame compatible 3D video signal, a 2D compatible 3D video signal or a 2D scalable video signal.

* * * * *